(12) United States Patent
Pyo et al.

(10) Patent No.: US 11,558,128 B2
(45) Date of Patent: Jan. 17, 2023

(54) ELECTRONIC DEVICE FOR CONTROLLING COMMUNICATION CIRCUIT ON BASIS OF SIGNAL RECEIVED FROM ANTENNA

(71) Applicant: SAMSUNG ELECTRONICS CO., LTD., Gyeonggi-do (KR)

(72) Inventors: Chulseung Pyo, Gyeonggi-do (KR); Dongil Yang, Gyeonggi-do (KR); Hyunseok Choi, Gyeonggi-do (KR); Jooseung Kim, Gyeonggi-do (KR); Youngmin Lee, Gyeonggi-do (KR); Jongin Lee, Gyeonggi-do (KR); Hyoseok Na, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/278,003

(22) PCT Filed: Sep. 20, 2019

(86) PCT No.: PCT/KR2019/012264
§ 371 (c)(1),
(2) Date: Mar. 19, 2021

(87) PCT Pub. No.: WO2020/060306
PCT Pub. Date: Mar. 26, 2020

(65) Prior Publication Data
US 2021/0359771 A1 Nov. 18, 2021

(30) Foreign Application Priority Data

Sep. 21, 2018 (KR) .................. 10-2018-0113553

(51) Int. Cl.
*H04B 17/13* (2015.01)
*H04B 17/10* (2015.01)
*H04B 17/27* (2015.01)

(52) U.S. Cl.
CPC ........... *H04B 17/13* (2015.01); *H04B 17/103* (2015.01); *H04B 17/27* (2015.01)

(58) Field of Classification Search
CPC ....... H04B 17/13; H04B 17/103; H04B 17/27
See application file for complete search history.

(56) References Cited

U.S. PATENT DOCUMENTS 5,507,014 A * 4/1996 Wray .................... H03F 1/3294
455/115.2
6,111,462 A 8/2000 Mucenieks et al.
(Continued)

FOREIGN PATENT DOCUMENTS

CN 1390372 1/2003
JP 2010-081285 4/2010
(Continued)

OTHER PUBLICATIONS

PCT/ISA/210 Search Report issued on PCT/KR2019/012264, dated Dec. 26, 2019, pp. 5.
(Continued)

*Primary Examiner* — Junpeng Chen
(74) *Attorney, Agent, or Firm* — The Farrell Law Firm, P.C.

(57) ABSTRACT

Disclosed is an electronic device that includes a transmission amplifier; an antenna; a circulator disposed between the transmission amplifier and the antenna; a communication module which is connected to the circulator and which is for checking a signal received through the antenna; and a processor. The processor may be set to check the signal through the communication module and adjust the frequency characteristics of the antenna based at least in part on a determination that the signal is a signal reflected from the antenna.

13 Claims, 19 Drawing Sheets

(56) References Cited

U.S. PATENT DOCUMENTS

| | | |
|---|---|---|
| 8,525,648 B1 | 9/2013 | Henty |
| 2006/0290444 A1 | 12/2006 | Chen |
| 2010/0093282 A1* | 4/2010 | Martikkala .......... H04B 17/364 455/63.4 |
| 2011/0221519 A1* | 9/2011 | Katoh ................ H04B 1/0458 327/558 |
| 2012/0158917 A1 | 7/2012 | Knox |
| 2013/0021955 A1 | 1/2013 | Duron et al. |
| 2013/0069653 A1* | 3/2013 | Albrecht ............ G01R 33/3614 324/322 |
| 2013/0178175 A1* | 7/2013 | Kato .................... H03H 7/0161 455/107 |
| 2014/0055210 A1 | 2/2014 | Black et al. |
| 2016/0226653 A1* | 8/2016 | Bharadia ................ H04B 1/525 |
| 2017/0063425 A1* | 3/2017 | Khlat ........................ H01P 5/18 |
| 2019/0052234 A1* | 2/2019 | Braun ...................... H03F 3/72 |
| 2019/0280732 A1 | 9/2019 | Moon et al. |

FOREIGN PATENT DOCUMENTS

| | | |
|---|---|---|
| KR | 101559519 | 10/2015 |
| KR | 101722935 | 4/2017 |
| KR | 1020180061842 | 6/2018 |
| WO | WO0030248 | 5/2000 |
| WO | WO201723141 | 12/2017 |

OTHER PUBLICATIONS

PCT/ISA/237 Written Opinion issued on PCT/KR2019/012264, dated Dec. 26, 2019, pp. 6.
European Search Report dated Oct. 13, 2021 issued in counterpart application No. 19862781.2-1205, 16 pages.
Chinese Office Action dated Apr. 7, 2022 issued in counterpart application No. 201980062045.2, 17 pages.
Korean Office Action dated Oct. 21, 2022 issued in counterpart application No. 10-2018-0113553, 9 pages.

* cited by examiner

| Freq. spacing | TX1 | TX2 | Freq. | IMD3L | IMD3H | IMD5L | IMD5H | Isolation |
|---|---|---|---|---|---|---|---|---|
| 40 MHz | 30 dBm | 20 | 1.71 | -9.5 | -0.6 | -13 | -17.7 | 10 dB |
| | | 20 | 1.79 | -2.5 | -5.1 | -17.6 | -25.5 | |
| | | 10 | 1.71 | -28.1 | -9.2 | -44.1 | -33.4 | 20 dB |
| | | 10 | 1.79 | -17.4 | -25.5 | -32.3 | -52.7 | |
| | | 0 | 1.71 | -28.9 | -16.7 | -43.4 | -48.7 | 30 dB |
| | | 0 | 1.79 | -29.1 | -33.7 | -40.1 | -51.6 | |
| | | -10 | 1.71 | -31.8 | -21.5 | -42.8 | -45.5 | 40 dB |
| | | -10 | 1.79 | -37.4 | -36.9 | -43.9 | -58.8 | |
| 40 MHz | 27 dBm | 17 | 1.71 | -20.4 | -5.2 | -30.4 | -19.7 | 10 dB |
| | | 17 | 1.79 | -27.5 | -24.3 | -24.8 | -38.3 | |
| | | 7 | 1.71 | -31.3 | -13.4 | -46.7 | -38.9 | 20 dB |
| | | 7 | 1.79 | -34.5 | -40.9 | -39.4 | -54.3 | |
| | | -3 | 1.71 | -37.7 | -22.3 | -53.5 | -48.3 | 30 dB |
| | | -3 | 1.79 | -42.1 | -44.7 | -46.9 | -58.6 | |
| | | -13 | 1.71 | -40.9 | -27.6 | -55.1 | -50.1 | 40 dB |
| | | -13 | 1.79 | -41.5 | -46.9 | -50.5 | -63 | |

FIG.12A

| Freq. spacing | TX1 | TX2 | Freq. | IMD3L | IMD3H | Isolation |
|---|---|---|---|---|---|---|
| 40 MHz | 30 dBm | 20 | 1.71 | -24.5 | -230.5 | 10 dB |
| | | | 1.79 | -248.6 | -17.1 | |
| | | 10 | 1.71 | -45.3 | -251.8 | 20 dB |
| | | | 1.79 | -235.1 | -45.4 | |
| | | 0 | 1.71 | -65.8 | -210.3 | 30 dB |
| | | | 1.79 | -238.7 | -64.9 | |
| | | -10 | 1.71 | -87.4 | -248.6 | 40 dB |
| | | | 1.79 | -237.5 | -82.8 | |
| 40 MHz | 27 dBm | 17 | 1.71 | -27 | -262.9 | 10 dB |
| | | | 1.79 | -268.3 | -35.4 | |
| | | 7 | 1.71 | -47.3 | -264.6 | 20 dB |
| | | | 1.79 | -270.9 | -54.7 | |
| | | -3 | 1.71 | -67.2 | -272.5 | 30 dB |
| | | | 1.79 | -289.3 | -73.8 | |
| | | -13 | 1.71 | -87 | -282.2 | 40 dB |
| | | | 1.79 | -267.8 | -91.7 | |

FIG.12B

ELECTRONIC DEVICE FOR CONTROLLING COMMUNICATION CIRCUIT ON BASIS OF SIGNAL RECEIVED FROM ANTENNA

CROSS-REFERENCE TO RELATED APPLICATION(S)

This application is a National Phase Entry of PCT International Application No. PCT/KR2019/012264, which was filed on Sep. 20, 2019 and claims priority to Korean Patent Application No. 10-2018-0113553, which was filed on Sep. 21, 2018 in the Korean Intellectual Property Office, the contents of which are incorporated herein by reference.

BACKGROUND

1. Field

Various embodiments of the present disclosure relate to an electronic device for improving the performance of an antenna and preventing combustion of a power amplifier.

2. Description of the Related Art

In wireless communication, a transmission amplifier (e.g., a power amplifier) may amplify a signal and transmit the amplified signal through an antenna. A reception amplifier (e.g., a low noise amplifier) may minimize noise and amplify a small signal.

In an electronic device (e.g., a smartphone) providing a wireless communication function, combustion of a circuit element (e.g., a transmission amplifier or a reception amplifier) or degradation in the performance (e.g., sensitivity) of an antenna may occur, due to reflected waves or an inter-modulation distortion (IMD) component.

The electronic device may have a structure that is inadequate for securing antenna performance satisfying standards (e.g., a device structure minimized for portability, a narrow antenna sector structure, a multi-antenna structure, or a dual connectivity structure).

SUMMARY

In an electronic device providing a wireless communication function, a scheme may be required to prevent combustion of a circuit device or degradation in antenna performance due to reflected waves or an IMD component. A scheme may also be required to improve antenna performance by improving a structural limitation of an electronic device.

Various embodiments may provide an electronic device capable of preventing combustion of a circuit device or degradation in antenna performance due to reflected waves or an IMD component.

Various embodiments may provide an electronic device capable of improving antenna performance by improving a structural limitation thereof.

An electronic device according to various embodiments includes a transmission amplifier, an antenna, a circulator disposed between the transmission amplifier and the antenna, a communication module connected to the circulator to identify a signal received via the antenna, and a processor. The processor is configured to identify the signal through the communication module and adjust a frequency feature of the antenna based at least in part on a determination that the signal is a signal reflected from the antenna.

An electronic device according to various embodiments includes a first transmission amplifier configured to amplify a first signal of a first frequency band, a second transmission amplifier configured to amplify a second signal of a second frequency band, a first antenna connected to the first transmission amplifier, a second antenna connected to the second transmission amplifier, a circulator disposed between the first transmission amplifier and the first antenna, a communication module connected to the circulator to identify a signal received via the first antenna, and a processor. The processor is configured to send a signal of the first frequency band to the first transmission amplifier, send a signal of the second frequency band to the second transmission amplifier, identify the signal received via the first antenna by using the communication module, and adjust a feature of the second signal emitted via the second antenna by using the second transmission amplifier or the communication module, based at least in part on that the signal received via the first antenna includes at least a part of the second signal.

An electronic device according to various embodiments includes a first transmission amplifier and a second transmission amplifier configured to amplify a designated signal, a first coupler configured to obtain at least a pail of a first signal amplified through the first transmission amplifier, a second coupler configured to obtain at least a part of a second signal amplified through the second transmission amplifier, a third coupler configured to obtain at least a part of a third signal generated based at least in part on the first signal and the second signal, a communication module connected to the first coupler, the second coupler, and the third coupler, and a processor. The processor is configured to obtain at least a part of the first signal, at least a part of the second signal, and at least a part of the third signal through the communication module and adjust the first transmission amplifier or the second transmission amplifier, based at least in part on a determination that an amplitude of an inter-modulation distortion (IMD) signal for the at least a part of the first signal is greater than a designated amplitude and amplitudes of IMD signals for the at least a part of the second signal and the at least a part of the third signal are substantially equal to each other.

According to various embodiments, in an electronic device, combustion of a circuit device or degradation in antenna performance, caused by reflected waves or an IMD component, may be prevented.

According to various embodiments, it is possible to improve antenna performance by improving a structural limitation thereof.

BRIEF DESCRIPTION OF THE DRAWINGS

FIGS. 12A and 12B are views for describing an effect of an electronic device according to various embodiments.

DETAILED DESCRIPTION

Figure 1:
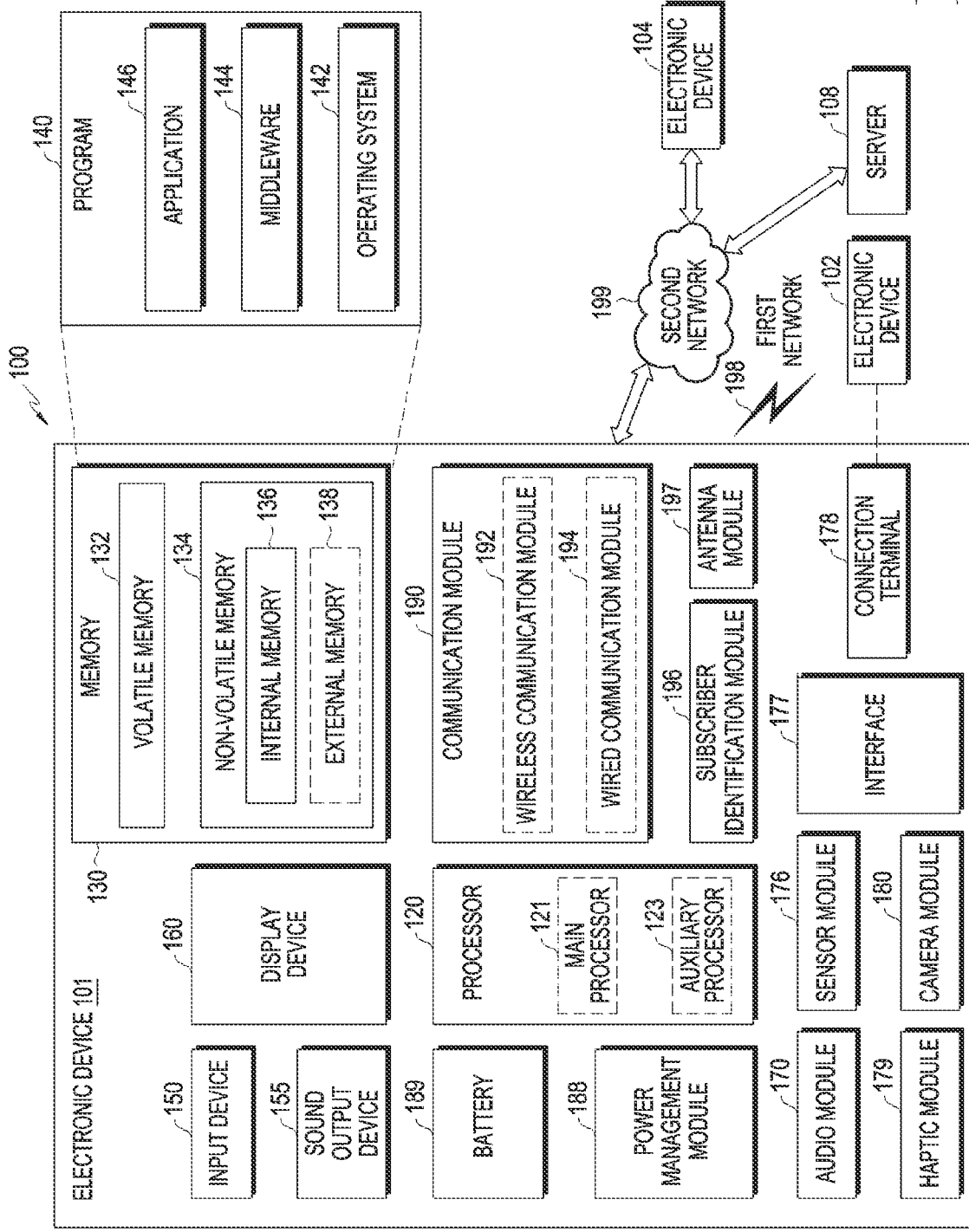
FIG. 1 is a block diagram of an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as a single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wireless-Fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment of the present disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, when the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device according to various embodiments may be one of various types of electronic devices, according to various embodiments of the present disclosure. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1$^{st}$" and "2$^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. When distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Hereinafter, generation of reflected waves or occurrence of inter-modulation distortion (IMD) in an electronic device 201 will be described as an example with reference to FIGS. 2A, 2B, 2C, 3, 4A, and 4B.

Figure 2A:
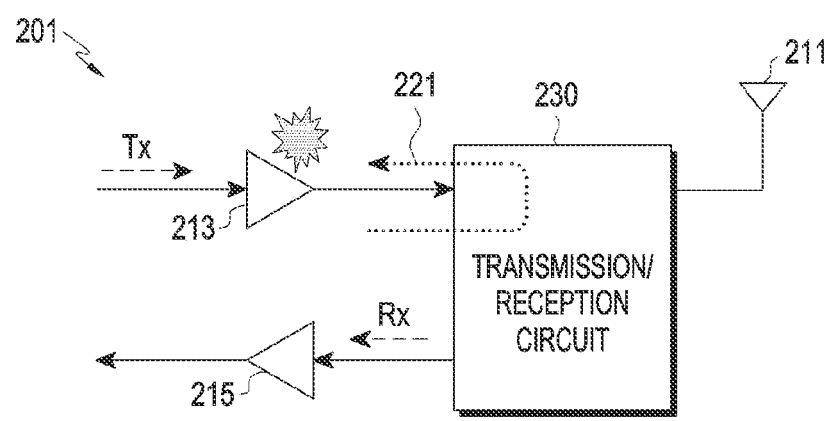
FIGS. 2A, 2B, and 2C illustrate problematic situations likely to occur in an electronic device due to reflected waves or inter-modulation distortion (IMD)

FIG. 2A illustrates a problematic situation originating from reflected waves in the electronic device 201. The reflected waves may mean at least a part of a transmission signal Tx, which is reflected and reversed.

Referring to FIG. 2A, the electronic device 201 may include an antenna 211, a transmission amplifier 213, a reception amplifier 215, and a transmission/reception (T/R) circuit 230.

In this structure, the transmission signal Tx input to the transmission amplifier 213 may be reflected without being correctly output, causing combustion of a circuit device (e.g., the transmission amplifier 213) or degradation in antenna performance (e.g., sensitivity or transmission performance). In FIG. 2A, 221 may indicate an inflow path of reflected waves based on the transmission signal Tx.

To raise a transmission power of the antenna 211, a higher output than an existing output may be required for the transmission amplifier 213. In addition, in a situation having a structural limitation (e.g., device miniaturization or a narrow antenna sector), a circuit supporting various and wide frequency bands may need to be implemented in the form of a single module. When an output level of the transmission amplifier 213 is raised and various and wide frequency bands are implemented in the form of a single module, device combustion or performance degradation may become serious due to reflected waves.

Figure 2B:
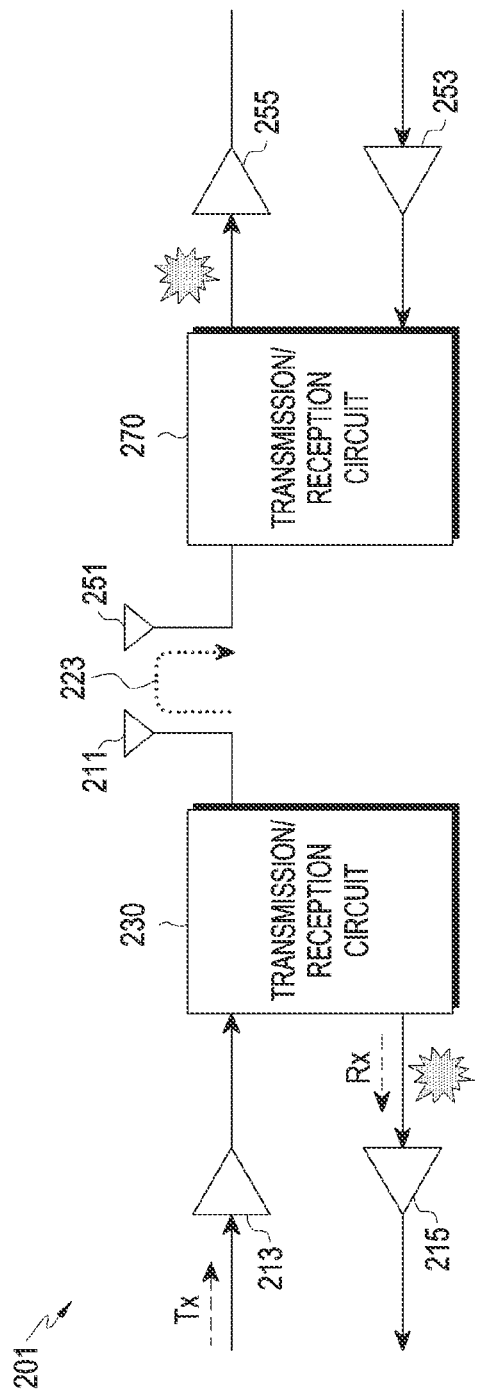
Figure 2C:
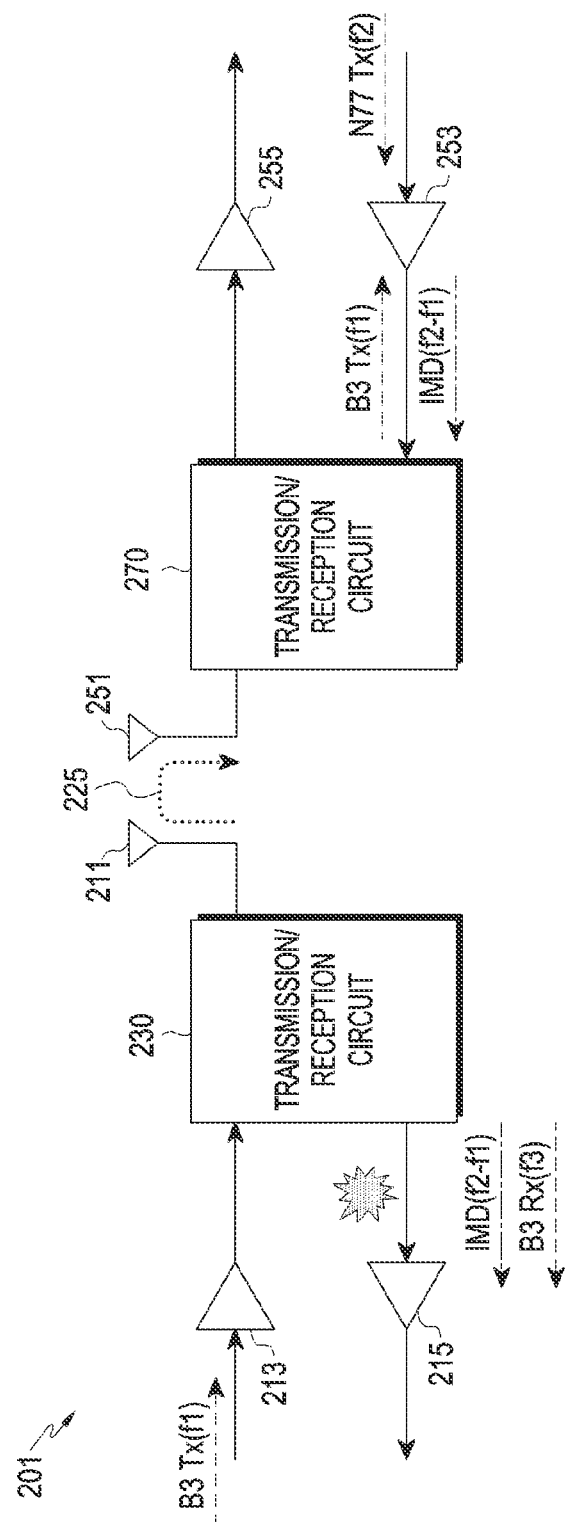

FIGS. 2B and 2C illustrate interference or IMD problematic situation due to usage of multiple antennas or multiple frequency bands.

The electronic device 201 may include a plurality of antennas 211 and 251 to use various frequency bands. Due to the plurality of antennas 211 and 251 using different frequencies, an interference component between signals or an IMD component of a new frequency may be generated. IMD may mean that a plurality of (two or more) frequencies interfere with each other such that an unnecessary frequency component (a parasite component) is generated. For example, an output frequency component obtained by combining a sum of and a difference between harmonic frequencies of two different input frequency signals may be shown.

FIGS. 2B and 2C illustrate an example of a dual connectivity structure supporting a first frequency band (e.g., a Long Term Evolution (LTE) B3 band) and a second frequency band (e.g., a 5$^{th}$-Generation (5G) N77 band).

In the dual connectivity structure, a plurality of (e.g., two or more) signals having different frequencies may be simultaneously output from the electronic device 201. In this case, due to interference between a plurality of signals using adjacent frequencies or IMD, antenna performance (e.g., sensitivity, transmission performance, or reception performance) may be seriously degraded.

As shown in FIGS. 2B and 2C, the electronic device 201 may include a first antenna 211, a first transmission amplifier 213, a first reception amplifier 215, and a first transmission/ reception circuit 230. The electronic device 201 may include a second antenna 251, a second transmission amplifier 253, a second reception amplifier 255, and a second transmission/reception circuit 270.

For example, the first antenna 211, the first transmission amplifier 213, the first reception amplifier 215, and the first transmission/reception circuit 230 may be intended to use the first frequency band (e.g., the LTE B3 band). The second antenna 251, the second transmission amplifier 253, the second reception amplifier 255, and the second transmission/reception circuit 270 may be intended to use the second frequency band (e.g., the 5G N77 band).

Referring to FIG. 2B, at least a part of the transmission signal Tx output via the first antenna 211 may be introduced to the second antenna 251. In this case, an unintended interference signal may be input to the second antenna 251. In FIG. 2B, 223 may indicate an example of an inflow path of an interference signal based on the transmission signal Tx. For example, a second-order harmonic component of the transmission signal Tx output from the first antenna 211 may be output from the first transmission amplifier 213 and may be introduced to the second reception amplifier 255 of the second antenna 251 in the dual-connectivity state, causing combustion of the circuit device or degradation of performance (e.g., reception performance).

Referring to FIG. 2C, in the dual connectivity state using the first transmission signal of the first frequency band (e.g., a transmission signal B3 Tx(f1) of a frequency f1 in the LTE B3 band) and the second transmission signal of the second frequency band (e.g., a transmission signal N77 Tx(f2) of a frequency f2 in the 5G N77 band), an interference signal may be generated, or an IMD signal of a new frequency may be generated due to a sum of or a difference between the two frequencies f1 and f2.

For example, the first transmission signal B3 Tx(f1) of the first frequency band output via the first antenna 211 may become an interference signal by being introduced to the second antenna 251. In FIG. 2C, 225 may indicate an example of an inflow path of an interference signal based on the first transmission signal (e.g., B3 Tx(f1)). The first transmission signal (e.g., B3 Tx(f1)) may be mixed with the second transmission signal (e.g., N77 Tx(f2)), causing an IMD component (e.g., IMD(f2−f1)). Such a signal (e.g., B3 Tx(f1) or IMD(f2−f1)) may cause combustion of the circuit device (e.g., the second transmission amplifier 253) or degradation of antenna performance (e.g., reception performance or transmission performance). The IMD component (e.g., IMD(f2−f1)), together with a reception signal (e.g., B3 Rx(f3)), may be introduced to the first reception amplifier 215, causing combustion of another circuit device (e.g., the first reception amplifier 215) or further degrading antenna performance.

Figure 3:
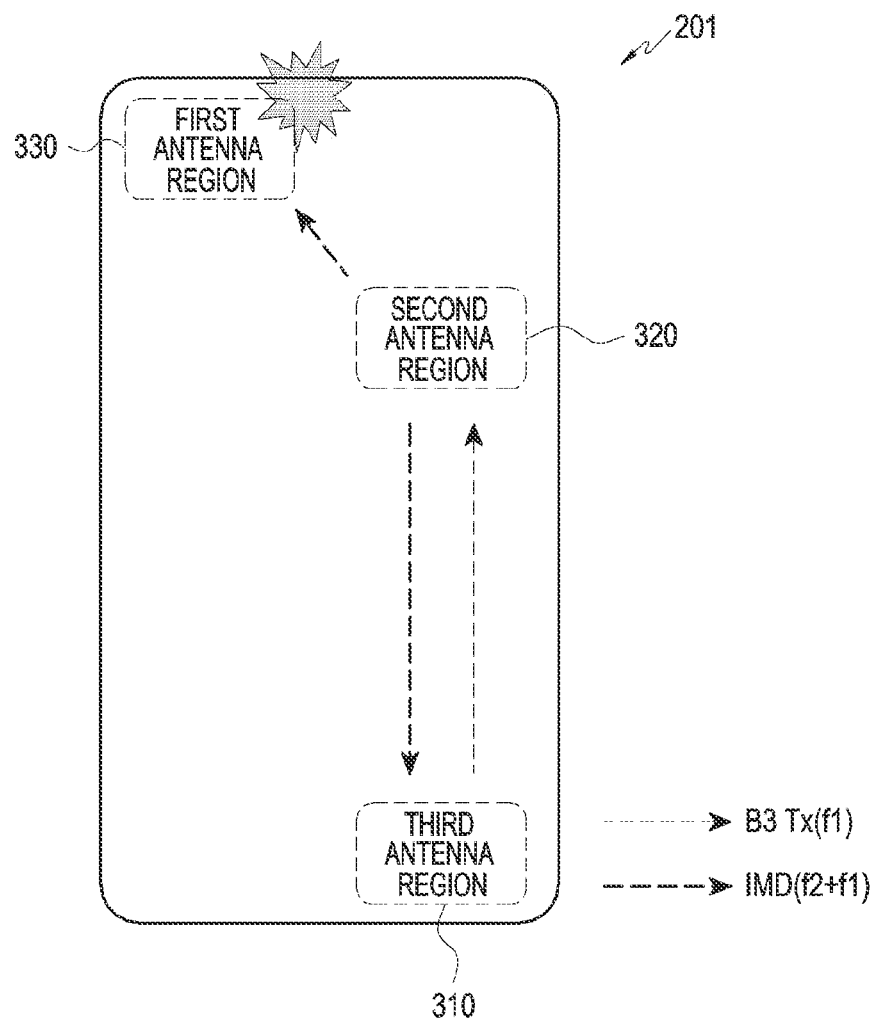
FIG. 3 illustrates a problematic situation originating from IMD in an electronic device.

FIG. 3 illustrates a problematic situation originating from IMD in the electronic device 201.

Referring to FIG. 3, in the electronic device 201, a first antenna region 310, a second antenna region 320, and a third antenna region 330 for using multiple frequency bands may be disposed. For example, the first antenna region 310 may be intended to use a first frequency band (e.g., a B3 band). The second antenna region 320 may be intended to use a second frequency band (e.g., a N77 band). The third antenna region 330 may be intended to use a third frequency band (e.g., a WiFi band).

In this structure, the first transmission signal (e.g., B3 Tx(f1)) output through the first antenna region 310 may be mixed with the second transmission signal (e.g., N77 Tx(f2)) output through the second antenna region 320, causing an IMD signal (e.g., IMD(f2+f1)). The IMD signal (e.g., IMD (f2+f1)) may be introduced to a signal reception path of the third antenna region 330, causing degradation of antenna performance (e.g., sensitivity or reception performance) of the third frequency band (e.g., the WiFi band).

Figure 4A:
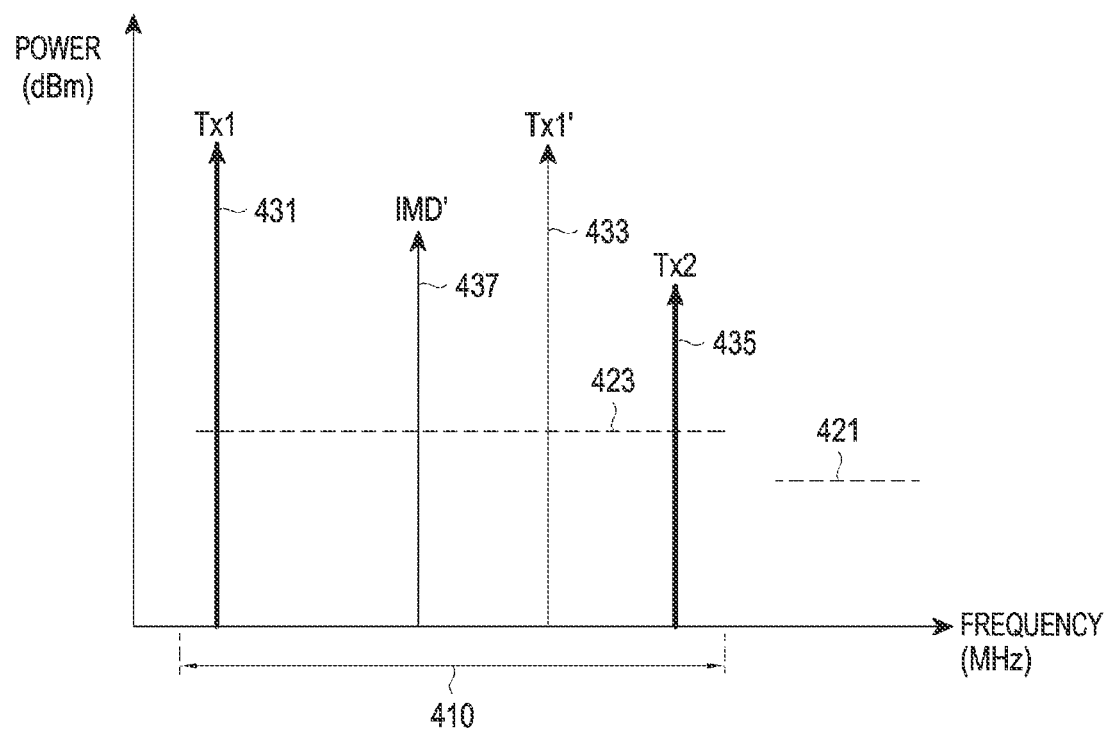
FIGS. 4A and 4B are graphs for describing occurrence of IMD in an electronic device.
Figure 4B:
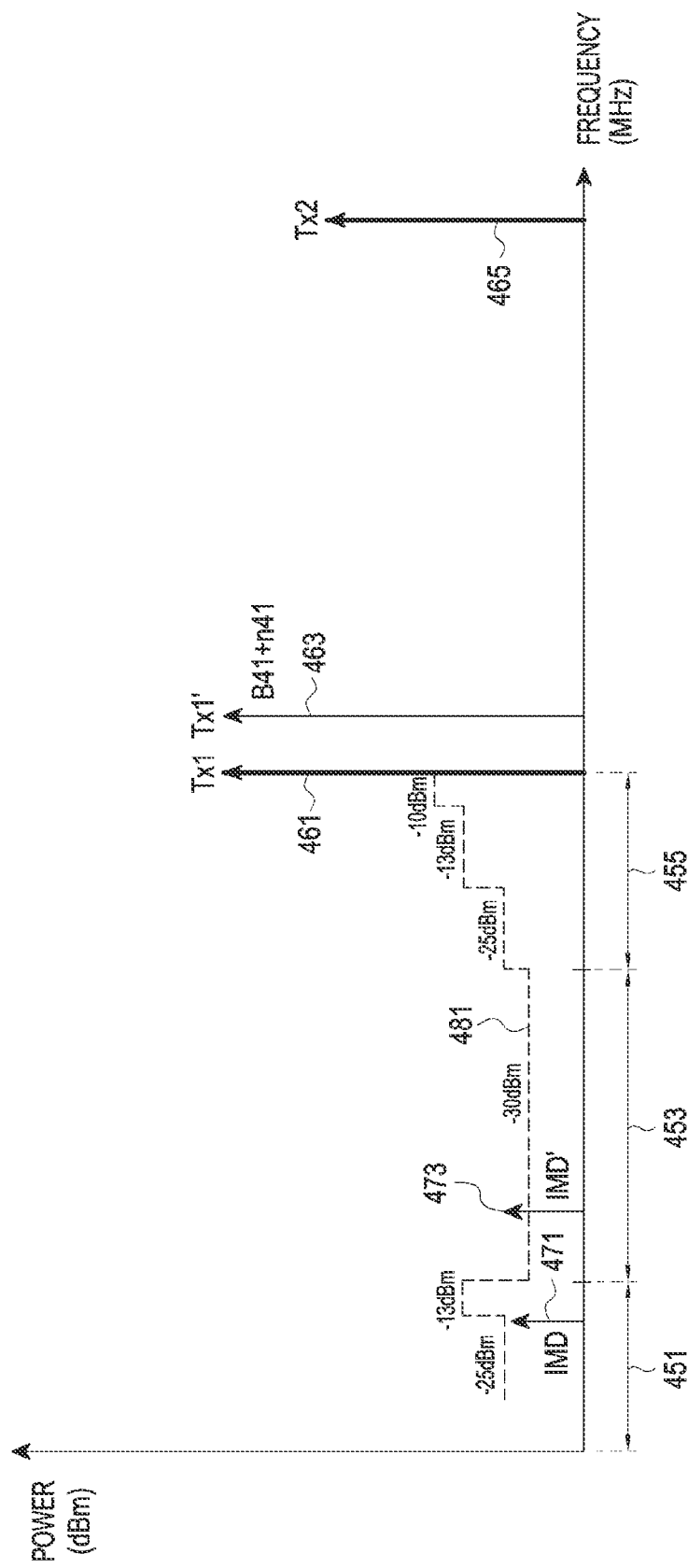

FIGS. 4A and 4B are graphs for describing occurrence of IMD in the electronic device 201.

In the dual connectivity structure, due to an IM component between two transmission signals, transmission performance may be affected negatively. For example, when spurious emission is used, an IMD component may be generated at one or two or more frequencies close to an immediately outside of a required bandwidth, causing degradation in transmission performance. Spurious emission may be intended to reduce a transmission power level without affecting information transmission through electric wave emission at one or two or more frequencies outside a required frequency bandwidth, thereby improving transmission performance.

FIG. 4A shows IMD spectrums 433 and 437 of a spurious emission band 410 in transmission of two frequency signals 431 and 435 of the B71 band and the N71 band in the dual connectivity structure using two frequency bands (e.g., the B71 band and the N71 band). In the spurious emission band 410, interference or the IMD components 433 and 437 between the two signals 431 and 435 may be generated. Transmission performance may be degraded by being affected by a spurious emission power level 423 due to the interference or the IMD components 433 and 437.

For example, in case of coexistence between a B21 band and a B29 band, for a spurious emission power level 421 of −50 dBm, when the two frequency signals 431 and 435 of the B71 band and the N71 band are transmitted, the spurious emission power level 423 may be set to −36 dBm due to the interference or the IMD components 433 and 437 between the two frequency signals 431 and 435. Thus, the spurious emission power level 423 may increase, degrading transmission performance.

FIG. 4B shows IMD spectrums 463, 471, and 473 in transmission of two frequency signals 461 and 465 of the B41 band and the N41 band in the dual connectivity structure using two frequency bands (e.g., the B41 band and the N41 band).

Due to the IMD components 471 and 473 between the two transmission signals 461 and 465, a transmission power level 481 may be changed. For example, when the two frequency signals 461 and 465 of the B41 band and the N41 band are transmitted, the IMD spectrums 471 and 473 may be shown in a first band 451 (e.g., an NS04 spectrum emission band), a second band 453 (e.g., a spurious emission band), and a third band 455 (e.g., an Evolved Universal Terrestrial Radio Access (E-UTRA) band).

A third-order IMD component (IMD3) is very close to a T/R frequency band, causing a bad problem to antenna performance.

To reduce an IMD component, a scheme may be considered to lower a power level of the IMD component by forcedly degrading maximum power performance of a signal. However, in this case, the intended transmission power level of the original signal is also lowered, making improvement of transmission performance insignificant. Thus, there is a need for an efficient scheme to prevent combustion of a circuit device and corresponding degradation of antenna performance by reducing an IMD component.

Hereinbelow, a structure of an electronic device 501 according to various embodiments will be described with reference to FIGS. 5A, 5B, and 6. The electronic device 501 may include the entire electronic device 101 illustrated in FIG. 1 or a part of the electronic device 101. A processor 550 of the electronic device 501 may be a processor of FIG. 1 (e.g., the processor 120). An antenna 511 or a communication module 540 of the electronic device 501 may include at least a part of an antenna module (e.g., the antenna module 197) or a communication module (e.g., the wireless communication module 192) of FIG. 1.

Figure 5A:
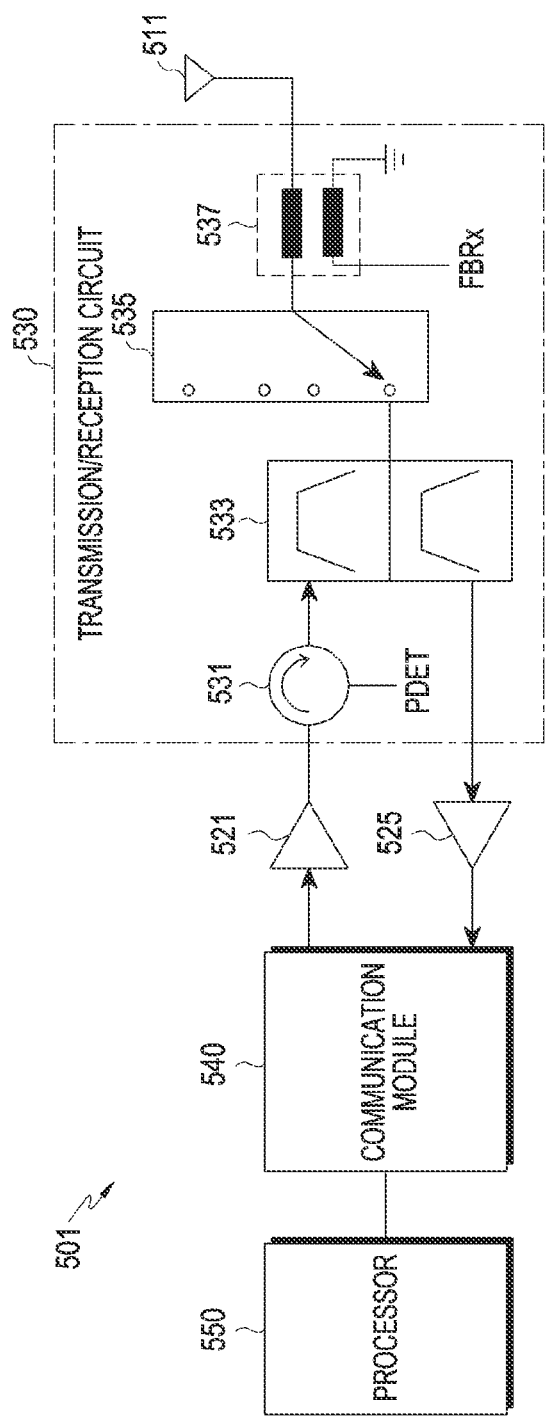
FIGS. 5A and 5B are circuit diagrams of an electronic device according to various embodiments.

FIG. 5A is a circuit diagram of the electronic device 501 according to various embodiments. The electronic device 501 of FIG. 5A may be intended to prevent the problematic situation due to reflected waves, illustrated in FIG. 2A. For example, the reflected waves may be generated due to distortion (mismatch) of a mistiming or asynchronous operation of a switching module 535 or a reflection feature value of the antenna 511 (e.g., at least one of a voltage standing wave ratio (VSWR), a reflection coefficient, or a reflection loss).

Referring to FIG. 5A, the electronic device 501 according to various embodiments may include the antenna 511, a transmission amplifier 521, a transmission/reception circuit 530, the communication module 540, and the processor 550. The transmission/reception circuit 530 may include a circulator 531. The transmission/reception circuit 530 may include at least one of a duplexer 533, a switching module 535, or a coupler 537. The electronic device 501 may further include a reception amplifier 525.

The communication module 540 may include a transceiver connected with the transmission amplifier 521 or the reception amplifier 525.

The processor 550 may include a processor illustrated in FIG. 1 (at least one of the processor 120, 121, or 123).

The antenna 511 may transmit a designated signal from the electronic device 501 to a space by emitting electromagnetic waves. The antenna 511 may receive a signal in the form of electromagnetic waves from the space in the electronic device 501.

The transmission amplifier 521 may amplify a transmission signal at a transmission end. The transmission amplifier 521 may include a power amplifier that minimizes distortion of a transmission signal to be output and maintains high-efficiency characteristics. The transmission amplifier 521 may receive a transmission signal from the communication module 540 and amplify the received transmission signal, and send the amplified transmission signal toward the antenna 511 through the transmission/reception circuit 530.

The transmission/reception circuit 530 may include at least one of a circulator 533, a duplexer 533, a switching module 535, or a coupler 537.

The transmission amplifier 521 and the duplexer 533 may operate differently according to a frequency band of a transmission signal or a communication scheme. For example, the transmission amplifier 521 may include a power amplifier of a multi-mode multiband (MMMB). The duplexer 533 may include a high-band (HB) duplexer, a middle-band (MB) duplexer, or a low-band (LB) duplexer. The transmission amplifier 521 may receive a transmission signal from the communication module 540 and amplify the received transmission signal, and send the amplified transmission signal to the duplexer 533.

The duplexer 533 may branch a transmission signal and a reception signal. The duplexer 533 may separate the transmission signal and the reception signal and perform filtering on a transmission frequency and a reception frequency. When a signal is transmitted via the antenna 511, the duplexer 533 may pass the transmission signal. When the signal is transmitted via the antenna 511, the duplexer 533 may pass the reception signal. The duplexer 533 may send the transmission signal toward the antenna 511 from the communication module 540. The duplexer 533 may send the reception signal toward the communication module 540 from the antenna 511. The duplexer 533 may receive the transmission signal from the transmission amplifier 521 and send the transmission signal to the antenna 511 through the coupler 537. The duplexer 533 may receive the reception signal from the antenna 511 through the coupler 537 and send the reception signal to the communication module 540.

The switching module 535 may be disposed between the coupler 537 and the duplexer 533 to provide a switching function. The switching module 535 may provide a switching function to transmit and receive signals of various frequency bands through the single antenna 511. For example, the switching module 535 may provide a switching function to transmit a transmission signal of a first frequency band through the antenna 511. The switching module 535 may provide a switching function to receive a reception signal of a second frequency band through the same antenna 511.

The coupler 537 may be a bidirectional coupler. The coupler 537 may be connected between the antenna 511 and the duplexer 533. The coupler 537 may receive a transmission signal from the duplexer 533. The coupler 537 may receive a reception signal from the antenna 511. The coupler 537 may separately detect the transmission signal and the reception signal.

The coupler 537 may branch a part of the transmission signal received from the duplexer 533 for sending to the communication module 540. The coupler 537 may identify whether a signal output through the duplexer 533 is emitted via the antenna 511 or reflected without being emitted, and send a part of the transmission signal to a feedback port FBRx of the communication module 540. The part of the transmission signal may be fed back to the communication module 540 from the coupler 537.

The signal branched via the coupler 537 may include a forward coupling signal. The forward coupling signal may be emitted via the antenna 511. The forward coupling signal may be a part of the transmission signal and may have the frequency and phase that are the same as those of the transmission signal. The strength of the forward coupling signal may be less than that of the transmission signal. The forward coupling signal may be used to calculate a reflection feature value. The coupler 537 may send a signal reflected from the antenna 511 to the communication module 540. The signal reflected from the antenna 511 may be sent from the coupler 537 to the communication module 540.

The signal branched via the coupler 537 may include a reverse coupling signal. The signal reflected without emitted via the antenna 511 may include the reverse coupling signal. The reverse coupling signal may include a signal reflected from the antenna 511. The reverse coupling signal may include a signal received via the antenna 511.

The reception amplifier 525 may be disposed at a rear state of the antenna 511 to amplify the signal received via the antenna 511 and send the amplified signal to the communication module 540. The reception amplifier 525 may include a low-noise amplifier designed at a low noise to optimize the entire noise performance.

The communication module 540 may generate the transmission signal. The communication module 540 may carry transmission data in carriers and send a transmission signal including the transmission data and the carriers toward the antenna 511. The transmission signal may be transmitted in the form of electromagnetic waves to outside the electronic device 501 via the antenna 511.

The transmission data may include data to be transmitted from the electronic device 501 to another electronic device (e.g., the electronic device 102 or 104 of FIG. 1) or uplink data to be transmitted to an upper node (e.g., a base station).

For generation of the transmission signal, the communication module 540 may include an oscillator that generates carriers. The communication module 540 may include a modulation circuit that performs modulation of carrying transmission data in the carriers generated from the oscillator. The communication module 540 may include radio frequency (RF) amplifier that amplifies modulated carriers to reinforce the strength of the transmission signal.

The communication module 540 may process the reception signal. The communication module 540 may receive a reception signal including reception data and carriers from the antenna 511 and extract the reception data from the reception signal. The communication module 540 may send the extracted reception data to the processor 550.

The reception data may include data received by the electronic device 501 from another electronic device (e.g., the electronic device 102 or 104 of FIG. 1) or downlink data received from an upper node (e.g., a base station).

To process a reception signal, the communication module 540 may include a demodulation circuit that performs demodulation of extracting reception data from the reception signal. The RF signal may amplify the reception signal to facilitate extraction of the reception data from the reception signal.

The processor 550 may control the communication module 540, the transmission amplifier 521, the reception amplifier 525, the transmission/reception circuit 530, and the antenna 511. The processor 550 may perform at least some of functions of the communication module 540 or all of the functions of the communication module 540.

The processor 550 may control an operation where the communication module 540 generates a transmission signal. The processor 550 may determine or generate transmission data to be included in the transmission signal and send the transmission data to the communication module 540.

The processor 550 may determine a communication scheme. The communication module 540 may generate a transmission signal from the transmission data according to a communication scheme determined by the processor 550. For example, when the processor 550 determines transmission data as a voice format and the communication scheme is determined as amplitude modulation (AM), the communication module 540 may carry the transmission data in the voice format in the carriers according to an AM scheme, thereby generating a transmission signal.

In the communication scheme, the processor 550 may determine a phase and a frequency for the transmission signal. The processor 550 may control the communication module 540 such that the transmission signal has a specific phase and a specific frequency. The processor 550 may transmit the transmission signal via the antenna 511.

The processor 550 may transmit or receive the signal through the communication module 540. The processor 550 may send the transmission signal to the communication module 540. The transmission signal output via the communication module 540 may be amplified via the transmission amplifier 521. The transmission signal may be transmitted to the coupler 537 via the duplexer 533. The duplexer 533 may separately transmit a high-frequency signal transmitted and received via the antenna 511 for separate transmission as a transmission signal and a reception signal for each communication band. The transmission signal passing through the coupler 537 may be transmitted to another electronic device (e.g., the electronic device 102 or 104 of FIG. 1) via the antenna 511 or the upper node.

The processor 550 may receive the reception signal via the antenna 511. The reception signal may be transmitted to the duplexer 533 via the coupler 537. The reception signal transmitted to the duplexer 533 may be transmitted to the processor 550 through the communication module 540.

The processor 550 may separately detect the forward coupling signal for the transmission signal and the reverse coupling signal reflected without being emitted via the antenna 511, by using the coupler 537.

According to various embodiments, the circulator 531 may be disposed between the transmission amplifier 521 and the antenna 511.

The circulator 531 may be a directional device. A signal input to each port of the circulator 531 may be sent to another adjacent port with the same transmission coefficient and reflection coefficient. Each port may be an input port and at the same time, an output port for an adjacent port.

The circulator 531 may normally pass a signal of a first direction (e.g., an output direction of the transmission signal, a direction from the transmission amplifier 521 to the antenna 511). The circulator 531 may block a signal of a second direction (e.g., a reverse direction of the first direction, an input direction of the reception signal, a direction in which the transmission signal is reflected, a direction from the antenna 511 to the transmission amplifier 521) or lead the signal to another path.

The circulator 531 may be disposed between the transmission amplifier 521 and the antenna 511 to send the signal amplified from the transmission amplifier 521 to the antenna 511 with a small loss. The circulator 531 may block a signal reflected from the antenna 511 or an unintended signal so as not to be sent to the transmission amplifier 521.

The circulator 531 may send a signal from the antenna 511 to the communication module 540. The signal may be received from the antenna 511. The signal may include a signal reflected from the antenna 511. The reflection signal may include a signal received from outside via the antenna 511. The reflection signal may include at least a pail of the transmission signal output from the transmission amplifier 521. The reflection signal may include a reverse coupling signal.

The circulator 531 may include a plurality of (e.g., three) ports. For example, a first port of the circulator 531 may be connected to an output terminal of the transmission amplifier 521. A second port may be connected to an input terminal of the duplexer 533 in the transmission/reception circuit 530. A third port may be connected to a power detection port (PDET) of the communication module 540 and send at least a part of a signal received via the antenna 511.

A normal transmission signal may losslessly pass through the circulator 531 toward the antenna 511.

The signal reflected from the transmission/reception circuit 530 (e.g., the switching module 535) or the antenna 511 may be sent by the circulator 531 to a separate path (e.g., the ground or the PDET of the communication module 540) rather than the transmission amplifier 521. An attenuator may be added between the circulator 531 and the PDET of the communication module 540, thereby preventing a large signal from being directly input to the communication module 540.

In an embodiment, the circulator 531 may directly abandon the signal (e.g., the reflection signal) received via the antenna 511 to the ground. In this case, the reflection signal may be simply removed without a separate algorithm for processing the reflection signal or an additional operation such as control for the circuit device (e.g., the switching module 535 or the transmission amplifier 521).

In another embodiment, the circulator 531 may receive the signal (e.g., the reflection signal) received via the antenna 511 and send the reflection signal to the PDET of the communication module 540.

The communication module 540 may be connected with the circulator 531 to identify the signal (e.g., a power detection signal) received via the antenna 511. For example, the signal may include a partial signal (reflected waves) reflected from the switching module 535 or the antenna 511 out of the transmission signal output from the transmission amplifier 521. The communication module 540 may receive and identify the signal through the circulator 531.

The processor 550 may identify the signal (e.g., the power detection signal) through the communication module 540, and adjust a frequency feature of the antenna 511 based at least in part on a determination that the identified signal is reflected from the antenna 511. In this case, combustion of the circuit device (e.g., the transmission amplifier 521) or degradation of the antenna performance may be effectively prevented from occurring due to reflected waves.

In various embodiments, the communication module 540 may monitor a signal input through the PDET from the circulator 531. The signal may be the power detection signal. The communication module 540 may continuously or periodically monitor the power detection signal. The communication module 540 may monitor whether a designated event requiring IMD component processing (e.g., a case where a power level of the power detection signal exceeds a threshold value) occurs.

The communication module 540 may identify or calculate information about the signal (e.g., at least one of analog-to-digital conversion (ADC) information for the amplitude of the signal, phase information, or frequency information).

The processor 550 may receive the signal and identify or analyze the signal by using information about the signal (e.g., at least one of a frequency, an amplitude, or a phase of the signal).

The processor 550 may identify whether the signal is reversed from reflected, based on the information about the signal (e.g., at least one of the frequency, the amplitude, or the phase of the signal). For example, the processor 550 may determine that the signal is a reflected wave, when a phase difference between the signal and the transmission signal output through the transmission amplifier 521 is 180 degrees.

The processor 550 may determine based on the frequency of the signal whether the signal is associated with the transmission signal output through the transmission amplifier 521. For example, the processor 550 may determine that the signal and the transmission signal are related to each other when the first frequency of the signal is substantially the same as the second frequency of the transmission signal, when the first frequency and the second frequency are included in a designated band (e.g., an adjacent band or a spurious emission band), or when the first frequency and the second frequency have a harmonic relationship.

The processor 550 may identify a position in which the signal is reflected (e.g., the antenna 511, the switching module 535, or an outside of the electronic device 501), based on that the signal is associated with the transmission signal.

The processor 550 may identify the position in which the signal is reflected, based on the phase of the signal. For example, the processor 550 may identify the position in which the signal is reflected, based on a phase difference between the signal and the transmission signal.

The processor 550 may adjust a frequency feature of the antenna 511, based on that the position in which the signal is reflected.

In an embodiment, the processor 550 may reset at least one circuit device (e.g., the switching module 535) related to the position to adjust a frequency feature of the antenna 511, based on that the position in which the signal is reflected is a specific circuit device (e.g., the switching module 535). For example, when the position in which the signal is reflected is the switching module 535, the processor 550 may control the switching module 535 or an interface (e.g., a mobile industry processor interface (MIPI)) of the transmission amplifier 521 in a previous stage of the switching module 535 to reset the switching module 535 or the transmission amplifier 521.

In another embodiment, the processor 550 may tune (or modify) a reflection feature value (e.g., at least one of a VSWR, a reflection coefficient, or a reflection loss) of the antenna 511 to adjust the frequency feature of the antenna 511, based on that the position in which the signal is reflected is the antenna 511. For example, the processor 550 may perform tuning by using a tuner circuit (not shown, e.g., including an inductor, a variable capacitor, and a tuning switch) of the antenna 511 such that a reflection feature value converges to a normal value. For example, the VSWR may mean a height ratio of standing waves generated by reflection in the antenna 511 and the VSWR may fall beyond a normal range due to reflected waves in a specific frequency band. In this case, when a matching operation with respect to a variable frequency is performed using the tuner circuit, the VSWR beyond the normal range may be adjusted to a normal value as the standing waves vary.

As such, the processor 550 may identify the position in which the signal is reflected (e.g., the antenna 511, the switching module 535, or an outside of the electronic device 501), by using information about the signal when the reflection signal is generated. The position in which the reflected waves are generated may be associated with a usage condition (e.g., a touch by a body like holding of the antenna 511, connection of an accessory like an earphone, etc.) or an operation condition (e.g., a dual connectivity state) of the electronic device 501. An impedance change may occur in the antenna 511 according to the usage condition or the device operation condition.

The processor 550 may adjust a frequency feature of the antenna 511 according to the position in which the reflected waves are generated. Under control of the processor 550, the antenna 511 may be designed to be tunable such that an impedance is at a position of 50 ohms at all times.

Thus, the frequency feature of the antenna 511 may be adaptively adjusted according to a change in the usage condition or the device operation condition. The impedance of the antenna 511 is at the position of 50 ohms in which optimal performance is shown, thereby preventing antenna performance from being degraded due to reflected waves. The power consumption of the electronic device 501 may be reduced.

Figure 5B:
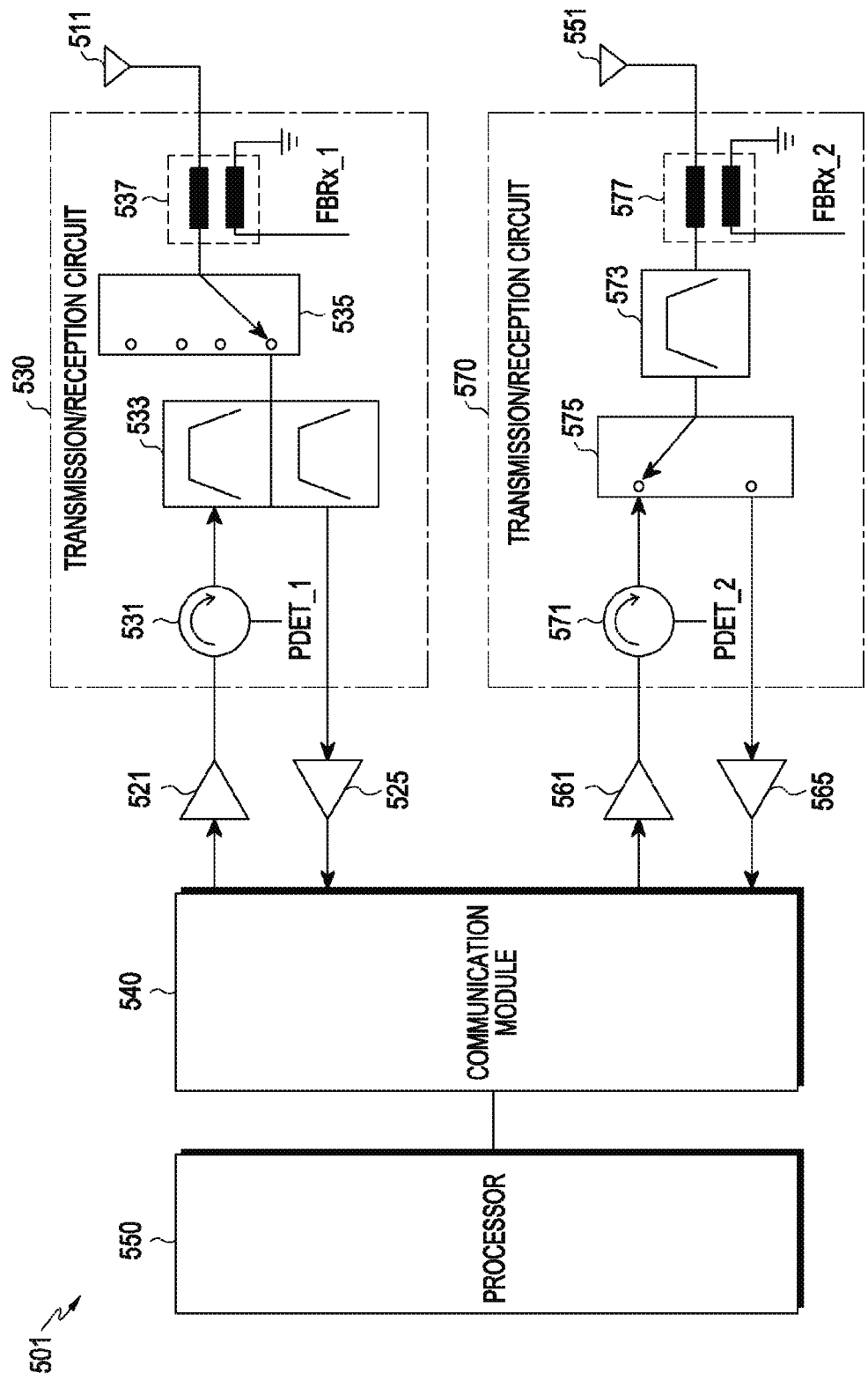

FIG. 5B is a circuit diagram of an electronic device according to various embodiments. The electronic device 501 of FIG. 5B may be intended to prevent a problematic situation from occurring due to an interference signal between multiple antennas shown in FIG. 2A.

The electronic device 501 may include a plurality of electronic devices 511 and 551 as shown. While it is illustrated in FIG. 5B for convenience of a description that the two antennas 511 and 551 are included, three or more antennas may also be included. Each of the antennas 511 and 551 may be connected to at least one of transmission/reception circuits 530 and 570, transmission amplifiers 521 and 561, or reception amplifiers 525 and 565. To output terminals of the transmission amplifiers 521 and 561, circulators 531 and 571 may be connected respectively.

Referring to FIG. 5B, the electronic device 501 according to various embodiments may include the first antenna 511, the first transmission amplifier 521, the second antenna 551, the second transmission amplifier 561, the first circulator 531, the communication module 540, and the processor 550. The electronic device 501 may further include at least one of the first reception amplifier 525, the first transmission/reception circuit 530, the second reception amplifier 565, the second circulator 571, or the second transmission/reception circuit 570. The first transmission/reception circuit 530 may include at least one of the first circulator 531, the duplexer 533, the switching module 535, or the coupler 537. The second transmission/reception circuit 570 may include at least one of the second circulator 571, a filter 573, a switch 575, or a coupler 577.

A basic operation or function of each circuit device (e.g., the antennas 511 and 551, the amplifiers 521 and 561, the reception amplifiers 525 and 565, the circulators 531 and 571, the transmission/reception circuits 530 and 570, the communication module 540, or the processor 550) has been described with reference to FIG. 5A, and thus will not be described repeatedly. A component using the same name or reference numeral may perform the same function or a similar function.

The second transmission/reception circuit 570 is illustrated as including the first transmission/reception circuit 530 and other components, but this illustration is merely an example for the description and the present disclosure is not limited thereto. For example, the second transmission/reception circuit 570 may have the same structure as the first transmission/reception circuit 530.

The switch 575 of the second transmission/reception circuit 570 may be disposed between the coupler 577 and the filter 573 to provide a switching function. The switch may be replaced with the switching module 535 that supports an extended frequency band or various frequency bands.

The filter 573 may separate the transmission signal and the reception signal and perform filtering on a transmission frequency and a reception frequency. Each filter 573 may be replaced with the duplexer 533 that supports an extended frequency band or various frequency bands.

The first antenna 511 and the second antenna 551 may emit electromagnetic waves to the space, and transmit a signal from the electronic device 501 to the space through the emitted electromagnetic waves. The first antenna 511 and the second antenna 551 may receive a signal in the electronic device 501 through electromagnetic waves emitted from another device (e.g., the electronic device 102 or 104 of FIG. 1 or the base station (not shown)) to the space. The first antenna 511 and the second antenna 551 may handle a transmission signal as a part of a transmission end. The first antenna 511 and the second antenna 551 may handle a reception signal as a part of a reception end.

The transmission signal may include a signal emitted to the space from the electronic device 501 via the first antenna 511 and the second antenna 551. The first transmission signal may include a signal emitted via the first antenna 511, and the second transmission signal may include a signal emitted via the second antenna 551. The reception signal may include a signal coming from the space to the electronic device 501 via the first antenna 511 and the second antenna 551.

The first antenna 511 and the second antenna 551 may operate dependently. The first antenna 511 and the second antenna 551 may transmit a signal as the transmission end or receive a signal as the reception end. The first antenna 511 and the second antenna 551 may transmit or receive the signals at the same time.

The first antenna 511 and the second antenna 551 may operate independently. The first antenna 511 may transmit a signal as the transmission end, and the second antenna 551 may receive a signal as the reception end. The first antenna 511 and the second antenna 551 may transmit or receive the signals at different timings.

Both use of the first antenna 511 and the second antenna 551 may be useful in terms of improvement of the performance (e.g., transmission performance) of the electronic device 501. However, any one single antenna may be used according to a design without being limited thereto.

According to various embodiments, the first antenna 511 may be used to transmit a transmission signal (e.g., B3 Tx(f1)) or receive a reception signal (e.g., B3 Rx(f3)) in the first frequency band (e.g., the B3 band). The second antenna 551 may be used to transmit a transmission signal (e.g., N77 Tx(f2)) or receive a reception signal (e.g., N77 Rx(f4)) in the second frequency band (e.g., the N77 band).

According to various embodiments, the first transmission amplifier 521 may amplify the first signal (e.g., B3 Tx(f1)) of the first frequency band. The first signal may be a first transmission signal.

The second transmission amplifier 561 may amplify the second signal (e.g., N77 Tx(f2)) of the second frequency band. The second signal may be a second transmission signal.

The first antenna 511 may be connected to the first transmission amplifier 521.

The second antenna 551 may be connected to the second transmission amplifier 561.

The first circulator 531 may be interposed between the first transmission amplifier 521 and the first antenna 511.

The first circulator 531 may send a normal transmission signal with a small loss toward the first antenna 511 and cause an unintended signal (e.g., at least one of a signal received in the first antenna 511, reflected waves, an interference signal, or an IMD component) to flow toward a specific port (e.g., the PDET), thereby preventing combustion of the first transmission amplifier 521. The unintended signal flowing toward the first transmission amplifier 521 from the first antenna 511 may be blocked through the first circulator 531, thereby preventing combustion of the first transmission amplifier 521.

In an embodiment, the second circulator 571 may be disposed between the second transmission amplifier 561 and the second antenna 551. When the circulator 571 is added to the second transmission amplifier 561, inflow of the first signal (e.g., B3 Tx(f1)) of the first frequency band, which is a cause for the IMD component, may be avoided, thus preventing degradation in reception performance.

The communication module 540 may be connected with the first circulator 531 to identify the signal received via the first antenna 511. In an embodiment, a port of the first circulator 531 may be connected to a power detection port PDET_1 of the communication module 540 to send a signal from the first antenna 511 to the communication module 540. The signal may be received via the first antenna 511. The signal may include an interference signal. The interference signal may be at least a part of the second signal that is a transmission signal in the second antenna 551, which flows to a signal reception path in the first antenna 511.

The processor 550 may send the first signal of the first frequency band to the first transmission amplifier 521 and the second signal of the second frequency band to the second transmission amplifier 561.

The processor 550 may identify the signal received via the first antenna 511 by using the communication module 540. The processor 550 may adjust a feature of the second signal emitted via the second antenna 551 by using the second transmission amplifier 561 or the communication module 540, based at least in part on that the signal received via the first antenna 511 includes at least a part of the second signal.

In an embodiment, the first circulator 531 may abandon the second signal unintendedly coming to the transmission/reception path of the first signal to the ground.

In another embodiment, the first circulator 531 may be connected to the power detection port PDET_1 of the communication module 540 rather than the ground. The processor 550 may periodically monitor the signal coming to the power detection port PDET_1 of the communication module 540 to identify or calculate information about the signal (e.g., at least one of an amplitude, a frequency, or a phase of the signal).

When the second signal flows to the signal transmission/reception path of the first antenna 511, causing interference with the first signal, the signal received via the first antenna 511 may include at least a pail of the second signal. The communication module 540 may receive the signal from the first circulator 531 through the power detection port PDET_1.

The processor 550 may identify the signal through the communication module 540. The processor 550 may adjust the feature of the second signal emitted via the second antenna 551 by using the second transmission amplifier 561 or the communication module 540, when the signal includes at least a part of the second signal.

In various embodiments, the processor 550 may identify or analyze the signal by using information about the signal (e.g., at least one of a frequency, an amplitude, or a phase of the signal).

The processor 550 may determine based on the frequency of the signal whether the signal includes at least a part of the second signal. The processor 550 may determine whether the amplitude of the second signal is greater than a designated amplitude, based on that the signal includes at least a part of the second signal.

The processor 550 may reduce the strength of the second signal emitted via the second antenna 551 by using the second transmission amplifier 561 or the communication module 540, based on that the amplitude of the signal is greater than the designated amplitude.

The processor 550 may change the phase of the second signal emitted via the second antenna 551 by using the second transmission amplifier 561 or the communication module 540, based on that the amplitude of the signal is greater than the designated amplitude.

Thus, it is possible to prevent occurrence of interference between two signals and generation of an IMD component in a transmission/reception frequency band or an IMD signal of a new frequency (f2−f1 or f2+f1). In a dual connectivity structure using various frequency bands, degradation of antenna performance (e.g., sensitivity, transmission performance, or reception performance) may be prevented.

Figure 6:
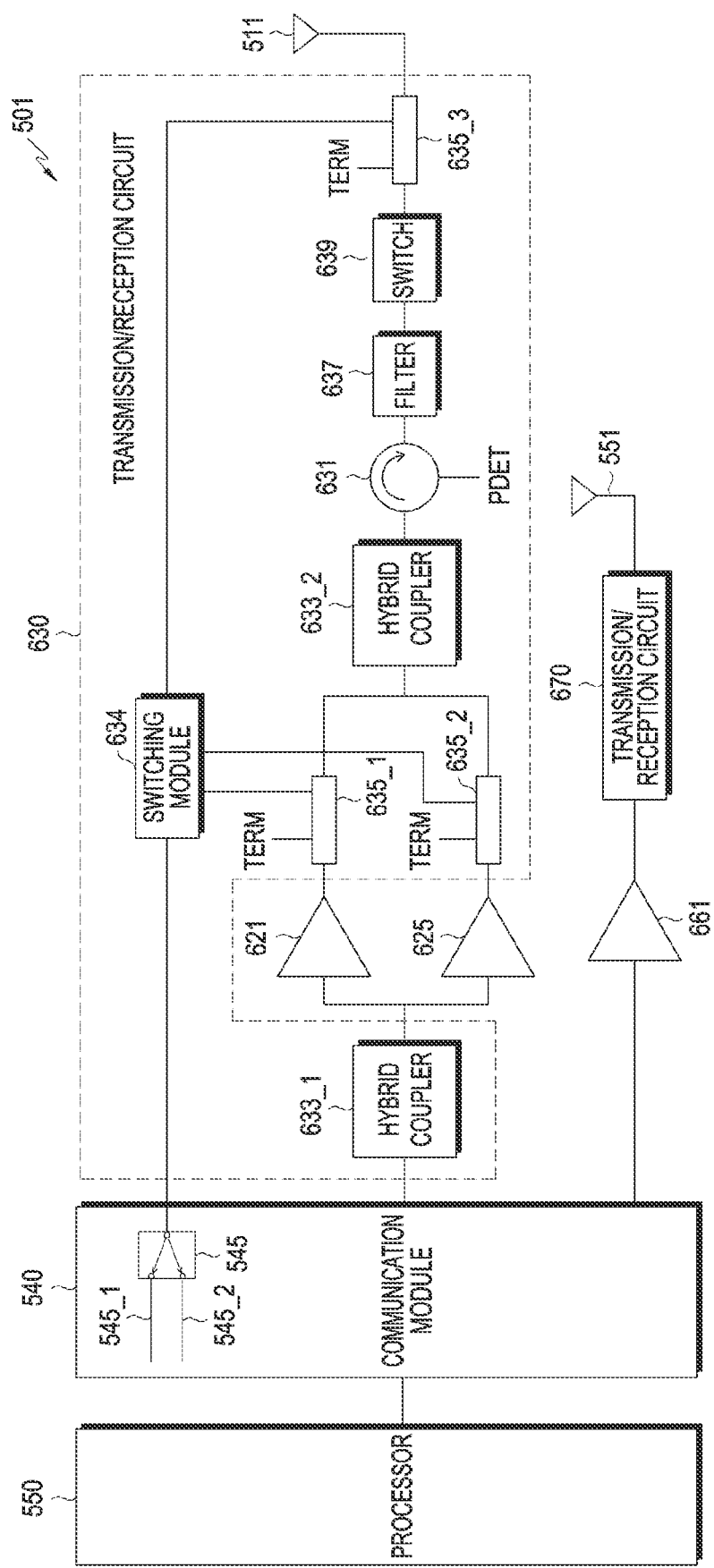
FIG. 6 is a circuit diagram of an electronic device according to various embodiments.

FIG. 6 is a circuit diagram of an electronic device according to various embodiments.

The electronic device 501 may include one or more antennas 511. While circuits for the two antennas 511 and 551 have been illustrated in FIG. 6 for convenience, one antenna 511 or three or more antennas and a circuit related to each antenna 511 may be included in the electronic device 501.

Referring to FIG. 6, the electronic device 501 according to various embodiments may include at least one of the first antenna 511, a first transmission amplifier 621, a second transmission amplifier 625, a first transmission/reception circuit 630, the communication module 540, or the processor 550. The first transmission/reception circuit 630 may include at least one of a first coupler 635_1, a second coupler 6352, or a third coupler 6353. The first transmission/reception circuit 630 may further include a circulator 631. The first transmission/reception circuit 630 may further include quadrature couplers 633_1 and 633_2. The first transmission/reception circuit 630 may further include at least one of a switching module 634, a filter 637, or a switch 639.

The electronic device 501 may further include the second antenna 551, a third transmission amplifier 661, and a second transmission/reception circuit 670.

In an embodiment, the third amplifier 661 may correspond to the second transmission amplifier 561 of FIG. 5B. The second transmission/reception circuit 670 may correspond to any one of the transmission/reception circuit 230 or 270 of FIG. 2B or the first transmission/reception circuit 530 or the second transmission/reception circuit 570 of FIG. 5B.

In another embodiment, a circuit (e.g., the third transmission amplifier 661 or the second transmission/reception circuit 670) connected to the second antenna 551 may have a structure that is the same as or similar with a circuit (e.g., the first transmission amplifier 621, the second transmission amplifier 625, or the first transmission/reception circuit 630) connected to the first antenna 511.

A basic operation or function of each circuit device is the same as or similar with that of FIGS. 5A and 5B, and thus will not be repeatedly described.

The first antenna 511 may be used to transmit and receive a signal by using the first frequency band.

The second antenna 551 may be used to transmit and receive a signal by using the second frequency band.

In various embodiments, the electronic device 501 may have a balanced amplifier structure including the dual transmission amplifiers 621 and 625.

The first coupler 625_1 and the second coupler 635_2 may be connected to output terminals of the first transmission amplifier 621 and the second transmission amplifier 625, respectively. The third coupler 635_3 may be disposed in a previous stage of the antenna 511. The third coupler 6353 may correspond to the coupler 537 or 577 of FIG. 5B.

The first coupler 635_1, the second coupler 635_2, and the third coupler 635_3 may be connected to the communication module 540 through the switching module 634. The switching module 634 may perform a switching operation for connecting each of the first coupler 6351, the second coupler 635_2, and the third coupler 635_3 to the communication module 540.

In various embodiments, the first transmission amplifier 621 and the second transmission amplifier 625 may amplify a designated signal.

The first coupler 635_1 may obtain at least a part of the first signal amplified through the first transmission amplifier 621.

The second coupler 635_2 may obtain at least a part of the second signal amplified through the second transmission amplifier 625.

The third coupler 635_3 may obtain at least a part of the third signal generated at least in part based on the first signal and the second signal.

The communication module 540 may be connected with the first coupler 635_1, the second coupler 635_2, and the third coupler 635_3.

The communication module 540 may obtain at least a part of the first signal and at least of the second signal which are output from the respective transmission amplifiers 621 and 625 through the first coupler 6351 and the second coupler 635_2 connected to the output terminals of the respective transmission amplifiers 621 and 625. The communication module 540 may obtain at least a part of the third signal generated at least in part based on the first signal and the second signal through the third coupler 635_3 in the antenna 511 end.

The communication module 540 may include a splitter 545. The splitter 545 may receive a signal (e.g., at least one of the first signal, the second signal, or the third signal) fed back from at least one of the first coupler 635_1, the second coupler 635_2, or the third coupler 635_3 through the switching module 634. The splitter 545 may branch a received feedback signal into a fundamental signal and an IMD (e.g., IMD3) and output them through output ports 545_1 and 545_2.

The processor 550 may receive the fundamental signal and the IMD signal of the feedback signal through the communication module 540 and analyze the received two signals. The processor 550 may adjust at least one of the first transmission amplifier 621 or the second transmission amplifier 625 to reduce or cancel the IMD signal based on a result of analysis.

The processor 550 may obtain and identify at least a part of the first signal, at least a part of the second signal, and at least a part of the third signal through the communication module 540.

The processor 550 may identify the fundamental signal and the IMD signal of each of the first signal, the second signal, and the third signal.

The processor 550 may compare amplitudes of IMD signals for the first signal, the second signal, and the third signal and control the first transmission amplifier 621 or the second transmission amplifier 625 (e.g., adjust the phase or bias thereof) based on a result of the comparison to reduce or attenuate IM) components.

The processor 550 may adjust the first transmission amplifier 621 and the second transmission amplifier 625 based at least in part on a determination that the amplitude of the IMD signal for the at least a part of the first signal is greater than a designated amplitude and the amplitudes of the IMD signals for the at least a part of the second signal and the at least a part of the third signal are substantially equal to each other.

In an embodiment, the processor 550 may modify a bias of the first transmission amplifier 621 or the second transmission amplifier 625 to reduce the amplitude of the IMD signal, based at least in part on a determination that the amplitude of the IMD signal for the at least a part of the first signal is greater than a designated amplitude and the amplitudes of the IMD signals for the at least a part of the second signal and the at least a part of the third signal are substantially equal to each other.

In another embodiment, the processor 550 may modify a phase of the first transmission amplifier 621 or the second transmission amplifier 625 to cancel the IMD signal, based at least in part on a determination that the amplitude of the IMD signal for the at least a part of the first signal is greater than a designated amplitude and the amplitudes of the IMD signals for the at least a part of the second signal and the at least a part of the third signal are substantially equal to each other.

The first transmission amplifier 621 and the second transmission amplifier 625 may be connected in parallel to form a balanced amplifier structure. An output of a previous stage of the first transmission amplifier 621 and the second transmission amplifier 625 may be branched into two outputs and thus may be connected to inputs of the first transmission amplifier 621 and the second transmission amplifier 625. The first transmission amplifier 621 and the second transmission amplifier 625 may be combined and connected to a next stage.

When the balanced amplifier structure is used, an effect of cancellation of reflected waves or an IMD component may be expected.

When the balanced amplifier structure is used, hybrid couplers 633_1 and 633_2 may be used in both ends of input terminals and output terminals of the first transmission amplifier 621 and the second transmission amplifier 625. In this case, fundamental signals output from the first transmission amplifier 621 and the second transmission amplifier 625 may be combined such that transmission power of an input terminal may be losslessly transmitted to the antenna 511 and the IMD component output from the first transmission amplifier 621 and the second transmission amplifier 625 may be attenuated with each other.

Additionally, the processor 550 may further maximize the IMD component attenuation effect of the first transmission amplifier 621 and the second transmission amplifier 625 by detecting the IMD component as well as the designated fundamental signal from the signal fed back through the third coupler 635_3 in the previous stage of the antenna 511 by using the splitter 545 for use in control of the first transmission amplifier 621 and the second transmission amplifier 625.

To balance phase imbalance of a signal output from the dual transmission amplifiers 621 and 625 forming the balanced amplifier structure, the couplers 635_1 and 635_2 may be added to the transmission amplifiers 621 and 625, respectively. Through this structure, phase and signal amplitudes of the respective transmission amplifiers 621 and 625 may be separately adjusted.

In the balanced amplifier structure, match in a gain variation and a phase variation between a path of the first transmission amplifier 621 and a path of the second transmission amplifier 625 may be important. When the couplers 635_1 and 635_2 are provided in the output terminals of the transmission amplifiers 621 and 625, variation compensation may be performed for each path of the transmission amplifiers 621 and 625. When the couplers 635_1 and 635_2 are provided in the output terminals of the transmission amplifiers 621 and 625, power or phase deviation for a chain of each of the transmission amplifiers 621 and 625 may be known, allowing a robust operation with respect to a load condition.

The first hybrid coupler 633_1 for branching a signal line input to the first transmission amplifiers 621 and the second transmission amplifier 625 may be connected to the previous stage of the first transmission amplifier 621 and the second transmission amplifier 625. The second hybrid coupler 633_1 for combing signal lines output from the first transmission amplifiers 621 and the second transmission amplifier 625 may be connected to the rear ends of the first transmission amplifier 621 and the second transmission amplifier 625. Through the first and second hybrid couplers 633_1 and 633_2, efficient input/output impedance match may be achieved in the balanced amplifier structure including the first transmission amplifier 621 and the second transmission amplifier 625.

In the electronic device 501, the first antenna 511 may be intended to emit the signal of the first frequency band (e.g., the first transmission signal). The electronic device 501 may further include the second antenna 551 isolated from the first antenna 511. The second antenna 551 may be intended to emit the signal of the second frequency band (e.g., the second transmission signal).

In an embodiment, the electronic device 501 may include the circulator 631 connected to the output ends of the dual transmission amplifiers 621 and 625.

An unintended signal flowing toward the transmission amplifiers 621 and 625 from the antenna 511 (e.g., at least one of the signal received in the antenna 511, reflected waves, the interference signal, or the IMD component) may be blocked by the circulator 631, thus preventing combustion of the transmission amplifiers 621 and 625.

In addition, the circulator 631 may send a power detection signal to the communication module 540 through a designated port (e.g., a PDET). The communication module 540 may detect occurrence of IMD using the power detection signal.

In various embodiments, the communication module 540 may be connected with the circulator 631 to identify the signal received via the first antenna 511. The processor 550 may identify the signal through the communication module 540, and adjust the first transmission amplifier 621 or the second transmission amplifier 625 based at least in part on that the signal includes at least a part of the IMD signal for the signal of the second frequency Land (e.g., the second transmission signal in the second antenna 551).

For example, the communication module 540 may receive the signal from the first antenna 511 through the PDET and send the received signal to the processor 550. The processor 550 may identify the received signal and determine that the IMD signal is generated when the signal exceeds a threshold value. In this case, the processor 550 may receive the first signal, the second signal, or the third signal fed back from the first coupler 635_1, the second coupler 635_2, or the third coupler 635_3 through the communication module 540 and identify the same. The processor 550 may compare the amplitudes of the IMD signals for the first signal, the second signal, and the third signal and adjust the phase or bias of the first transmission amplifier 621 or the second transmission amplifier 625 based on a result of the comparison to reduce or attenuate IMD components.

Hereinbelow, referring to FIG. 7 through 8C, partial structures applicable to the electronic device 501 according to various embodiments will be described with reference to FIGS. 7 through 8C.

Figure 7:
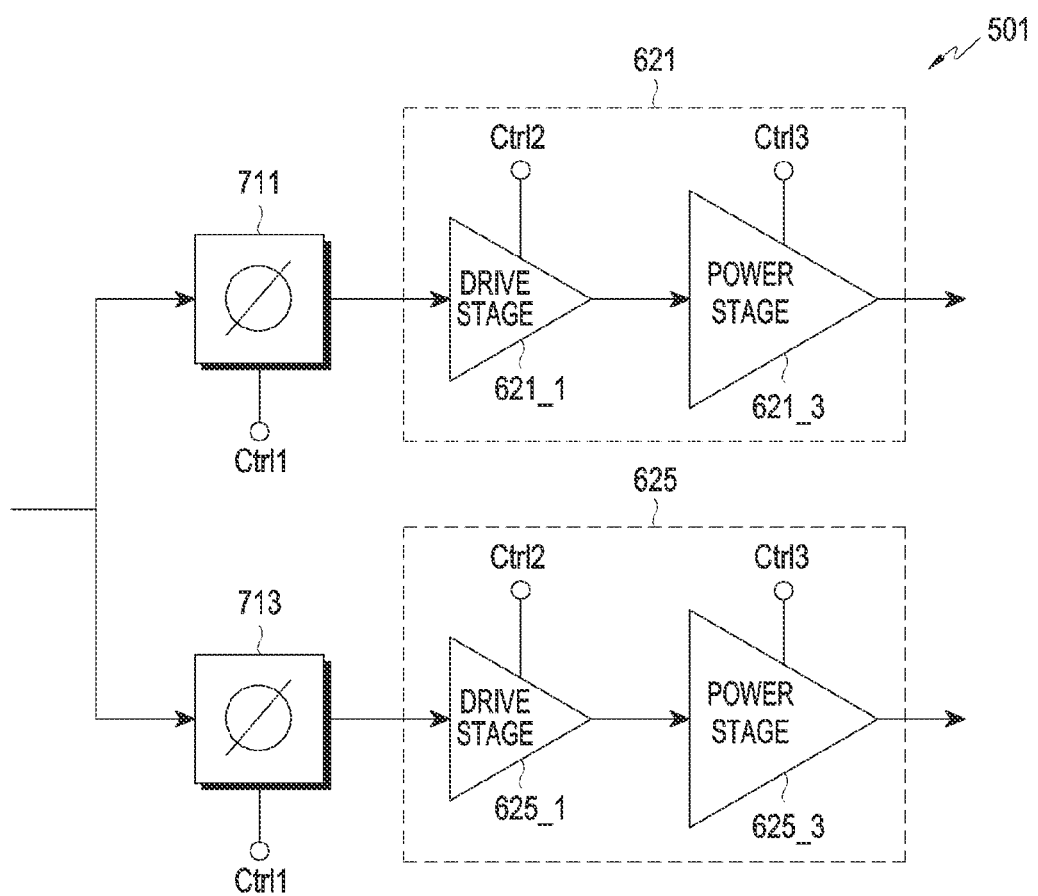
FIGS. 7, 8A, 8B, and 8C are views for describing partial structures applicable to an electronic device according to various embodiments.

FIG. 7 is a circuit diagram showing a detailed structure of the transmission amplifiers 621 and 625 according to various embodiments. The electronic device 501 may include the transmission amplifiers 621 and 625 and phase shifters 711 and 713 in the previous stage of the transmission amplifiers 621 and 625.

The first transmission amplifier 621 and the second transmission amplifier 625 may have the same structure.

Each of the transmission amplifiers 621 and 625 may have a multi-stage structure (e.g., a two-stage structure) as shown in FIG. 7. The first transmission amplifier 621 may include a plurality of amplifiers 621_1 and 621_3. The second transmission amplifier 625 may include a plurality of amplifiers 625_1 and 625_3.

Each transmission amplifier 621 or 625 may include a driving-stage amplifier 621_1 or 625_1 and a power-stage amplifier 621_3 or 625_3. The phase shifters 711 and 713 may be added to input of the transmission amplifiers 621 and 625, respectively.

A signal input to the transmission amplifier 621 may be out after being multi-stage amplified through the plurality of amplifiers 621_1 and 621_3. The signal amplified by the last stage of the plurality of amplifiers 621 and 623, e.g., the amplifier 621_3, may be transmitted to the corresponding antenna 511.

The processor 550 may transmit a control signal Ctrl1, Ctrl2, or Ctrl3 to control at least one of a phase, a gain, or a bias of each of the transmission amplifiers 621 and 625.

The processor 550 may detect occurrence of IMD based on at least one of the first signal, the second signal, or the third signal fed back from the first coupler 635_1, the second coupler 635_2, or the third coupler 636_3. For example, the processor 550 may determine that an IMD signal is generated, when the amplitude of an IMD signal for the at least a part of the first signal is greater than a designated amplitude and the amplitudes of IMD signals for the at least a part of the second signal and the at least a part of the third signal are substantially equal to each other.

The processor 550 may adjust each of the transmission amplifiers 621 and 625 to reduce or cancel an IMD component in case of occurrence of IMD. In an embodiment, the processor 550 may modify biases for the first transmission amplifier 621 and the second transmission amplifier 625. In another embodiment, the processor 550 may modify phases of the first transmission amplifier 621 and the second transmission amplifier 625.

Among features that may damage the transmission amplifiers 621 and 625, for a gain feature, the gain feature of the driving stage may be dominant, and for an IMD component and a power feature, the linearity or power feature of the power stage may be dominant.

Thus, when a fundamental signal and an IMD signal may be identified from a feedback signal (e.g., at least one of the first signal, the second signal, or the third signal) to control a bias of the driving stage based on the power level of the fundamental signal and a bias of the power stage based on the power level of the IMD signal, the transmission power may be effectively controlled using the gain feature of the driving stage and the bias of the power stage may be optimized for the path of each of the transmission amplifiers 621 and 625 in the balanced impedance structure, thereby maximizing the effect of IMD component attenuation.

Moreover, in the balanced amplifier structure, the phase deviation between the transmission amplifiers 621 and 625 may be compensated to improve the effect of IMD component attenuation.

Figure 8A:
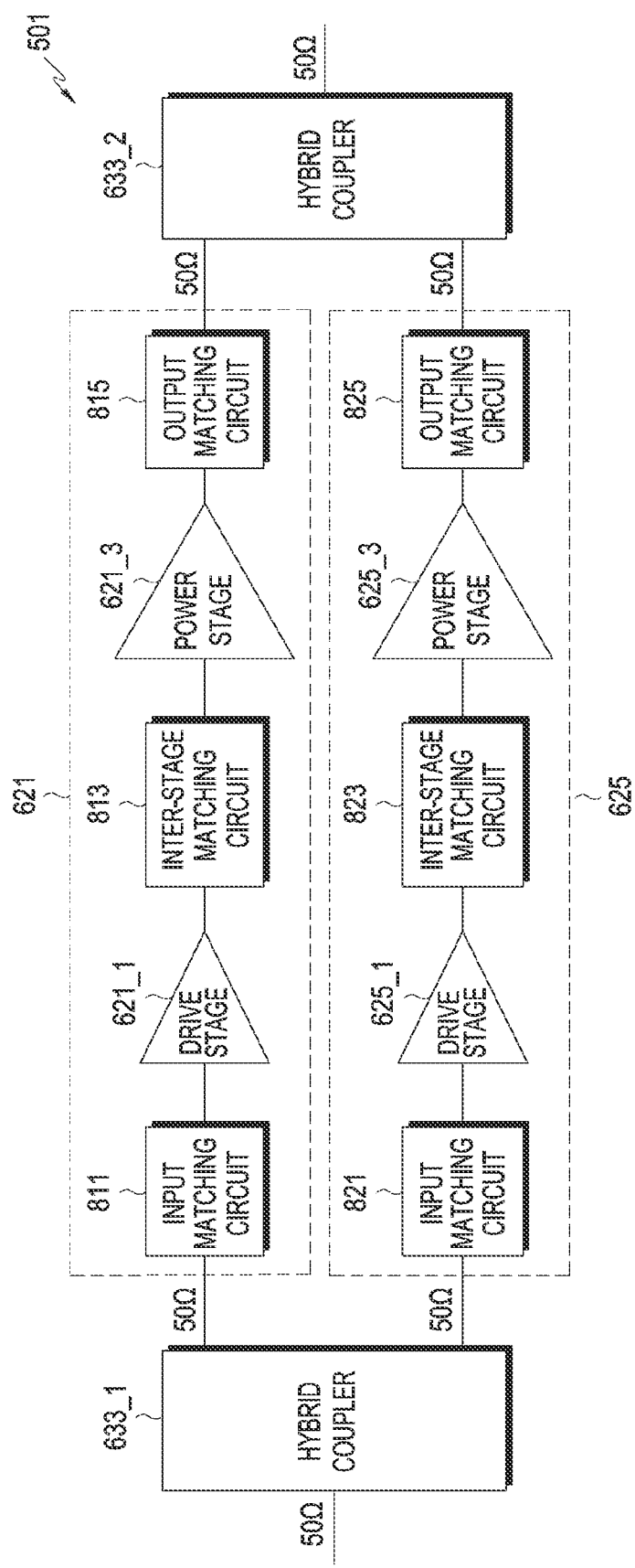
Figure 8B:
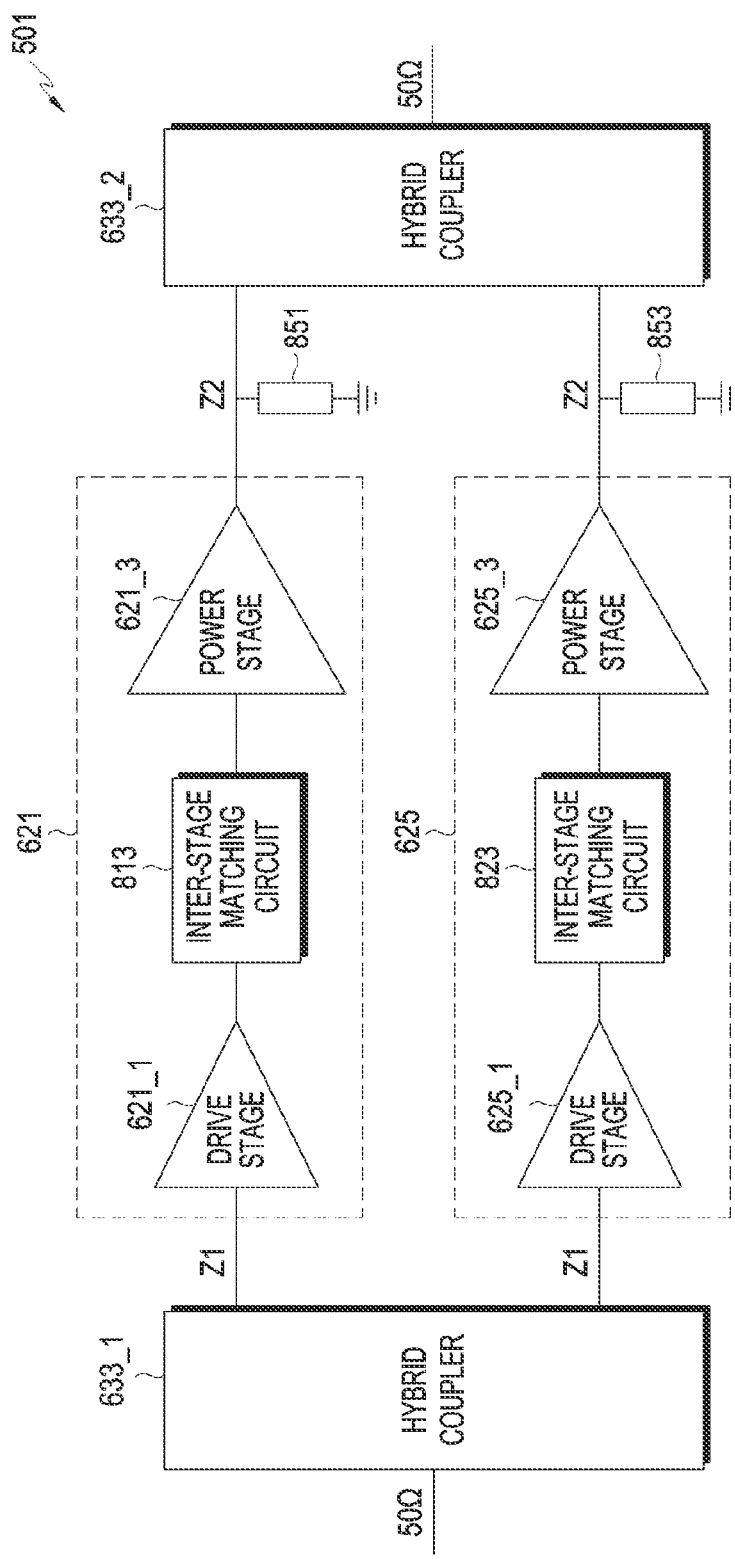

FIGS. 8A and 8B are circuit diagrams showing a detailed structure of the transmission amplifiers 621 and 625 according to various embodiments.

As shown in FIG. 8A, the transmission amplifiers 621 and 625 may form a multi-stage structure (e.g., a two-stage structure). The dual transmission amplifier 621 and the second transmission amplifier 625 may be connected in parallel to form a balanced amplifier structure. Each transmission amplifier 621 or 625 may include a driving-stage amplifier 621_1 or 625_1 and a power-stage amplifier 621_3 or 625_3.

Input matching circuits 811 and 821 and output matching circuits 815 and 825 may be added to input/output of the transmission amplifiers 621 and 625 forming the balanced amplifier structure. Inter-stage matching circuits 813 and 823 may be added between the driving-stage amplifier 621_1 or 625_1 and the power-stage amplifier 621_3 or 625_3 of each transmission amplifier 621 or 625.

Each hybrid coupler 633_1 or 633_2 may be connected to inputs/outputs of the dual transmission amplifiers 621 and 625. Input/output terminals of the transmission amplifiers 621 and 625 may be impedance-matched to 50 ohms. Input/output terminals of the hybrid couplers 633_1 and 633_2 may be impedance-matched to 50 ohms.

When the transmission amplifiers 621 and 625 include the input matching circuits 811 and 821, the inter-stage matching circuits 813 and 823, and the output matching circuits 815 and 825 in the balanced amplifier structure, a size may increase due to an area of a passive device. To compensate for this point, a structure in which the input matching circuits 811 and 821 and the output matching circuits 815 and 825 are included in the hybrid couplers 633_1 and 633_2, respectively, may be applied.

Referring to FIG. 8B, the input matching circuits 811 and 821 may be included in the hybrid coupler 633_1 through impedance adjustment with the first hybrid coupler 633_1. The output matching circuits 815 and 825 may be included in the hybrid coupler 633_2 through impedance adjustment with the second hybrid coupler 633_2.

Through this structure, the overall size of the balanced amplifier structure may be reduced. When impedances of input/output terminals of the transmission amplifiers 621 and 625 have random values Z1 and Z2, without a need to satisfy a 50 ohm impedance feature for the input/output terminals of each transmission amplifier 621 or 625 and input/output terminals of each hybrid coupler 633_1 or 633_2, the transmission amplifiers 621 and 625 may be connected with the hybrid couplers 633_1 and 633_2 and only a final stage may have 50 ohms, thereby largely reducing the area of a passive device.

Parallel capacitors 851 and 853 may be connected to the output terminal of each of the transmission amplifiers 621 and 625 and a node between the hybrid couplers 633_1 and 633_2 to short-circuit a second-order harmonic component that is one of main causes for generating an IMD component. The parallel capacitors 851 and 853 may operate as shunt circuits for cancelling a corresponding frequency signal. Thus, before an IMD component is removed by power combination through the hybrid couplers 633_1 and 633_2, a reflected IMD component may be preemptively attenuated further by the parallel capacitors 851 and 853.

Figure 8C:
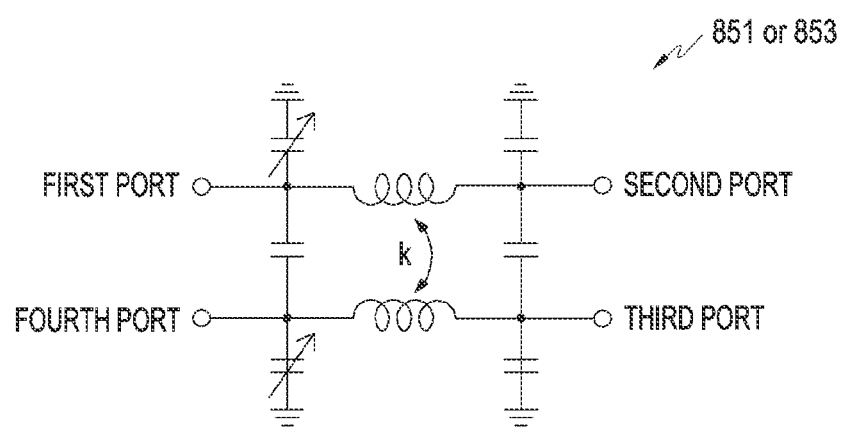

FIG. 8C illustrates a lumped hybrid coupler structure using a variable resistor or a switching capacitor.

For example, to a first port and a fourth port of the hybrid couplers 633_1 and 633_2 connected to the output terminals of the two transmission amplifiers 621 and 625, the parallel capacitors 851 and 853 may be connected as shunt circuits.

When the lumped hybrid coupler structure is applied to the hybrid couplers 633_1 and 633_2, the parallel capacitors 851 and 853 connected to the first port and the fourth port to compensate for phase imbalance may be replaced with variable resistors or switching capacitors, thereby effectively adjusting phase imbalance.

Figure 9:
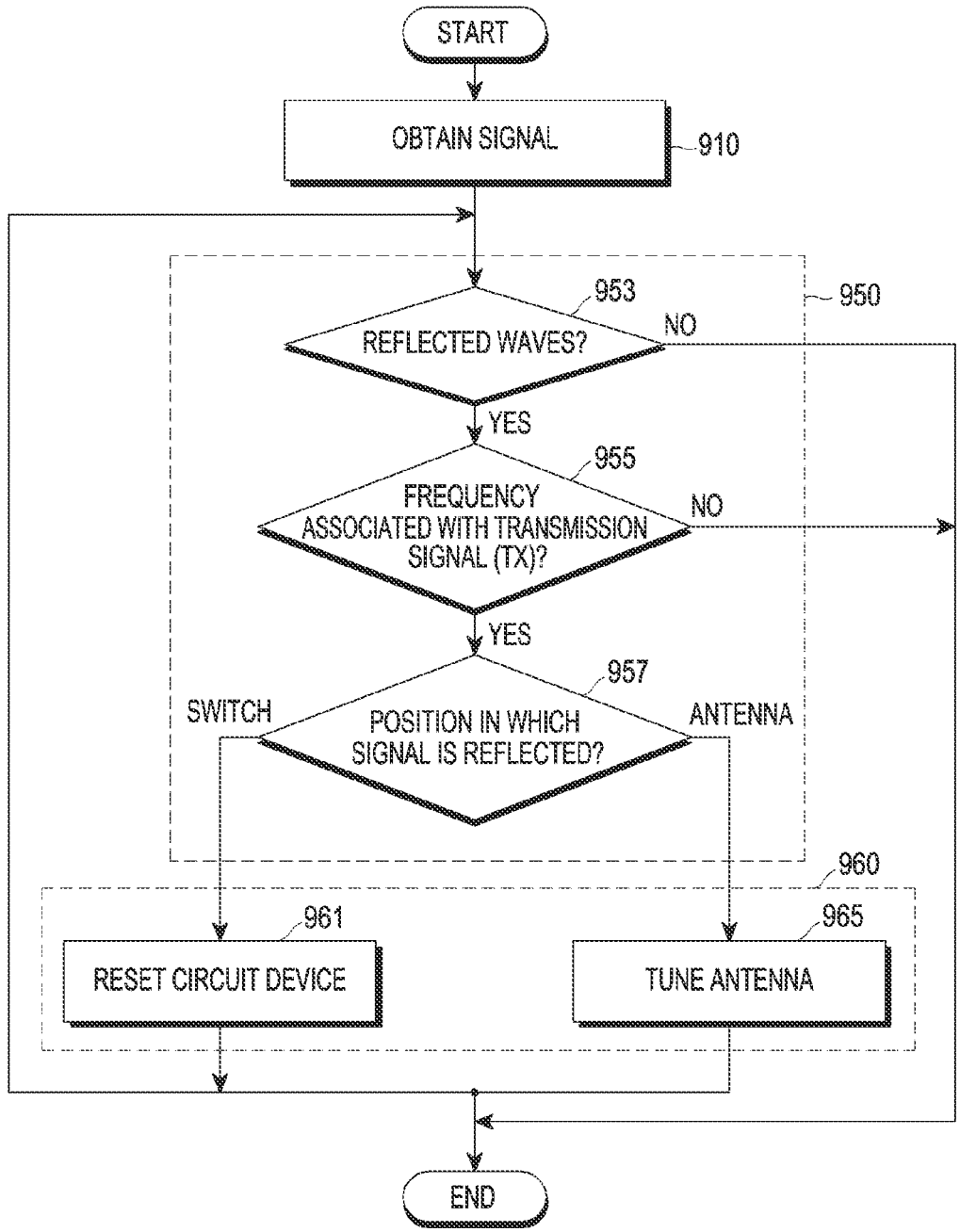
FIGS. 9, 10, and 11 are flowcharts showing a method for improving antenna performance of an electronic device according to various embodiments.

FIG. 9 is a flowchart showing a method for improving antenna performance of an electronic device according to various embodiments. The method shown in FIG. 9 may be executed by the electronic device 501 of FIG. 5A or FIG. 6. Hereinbelow, the method will be described assuming the operations of the electronic device 501 of FIG. 5A.

The method of FIG. 9 may be intended to prevent a problematic situation due to reflected waves. The problematic situation caused by reflected waves may occur due to mis-timing or asynchronization of the switching module 535 or distortion of a reflection feature value of the antenna 511.

In operation 910, the processor 550 of the electronic device 501 may obtain a signal received via the antenna 511. The signal may be sent from the antenna 511 to the communication module 540 through the circulator 531. The signal may be input to the processor 550 through the communication module 540 connected with the circulator 531. The signal may be periodically input to the processor 550 through the communication module 540.

In an embodiment, the signal may be a reflection signal reflected (reflected waves) from the antenna 511. The circulator 531 may send the reflection signal to the communication module 540.

The processor 550 may control the communication module 540 to emit a transmission signal to the antenna 511 through the transmission amplifier 521. At least a part of the transmission signal sent from the transmission amplifier 521 to the antenna 511 may be reflected from the antenna 511 to the transmission amplifier 521. The communication module 540 may obtain the reflection signal through the circulator 531. The processor 550 may obtain the reflection signal through the communication module 540.

In operation 950, the processor 550 may identify or analyze the signal obtained from the circulator 531.

In an embodiment, operation 950 may include operations 953 through 957.

In operation 953, the processor 550 may determine whether the signal is a reflection signal reflected (reflected waves) from the antenna 511, based on a state of a signal input through the circulator 531 (e.g., at least one of a frequency, an amplitude, or a phase).

When determining that the signal is the reflection signal in operation 953, the processor 550 may proceed to operation 955.

In operation 955, the processor 550 may determine based on the frequency of the signal whether the signal is associated with the transmission signal Tx output through the transmission amplifier 521. For example, the processor 550 may determine that the signal is associated with the transmission signal Tx, when a frequency of the signal is equal to or falls within an adjacent range of a frequency of the transmission signal Tx or when the signal is analyzed as the harmonic wave of the transmission signal.

When determining that the signal is associated with the transmission signal Tx in operation 955, the processor 550 may proceed to operation 957.

In operation 957, the processor 550 may identify from which the signal is reflected (a position or point in which the reflected waves are generated). In an embodiment, the processor 550 may identify the position in which the signal is reflected, based on the phase of the signal. For example, the position in which the signal is reflected is a particular circuit device (e.g., the switching module 535) or the antenna 511, based on how much the phase of the signal is different from the phase of the transmission signal Tx.

In operation 960, the processor 550 may adjust a frequency feature of the antenna 511 based at least in pail on that the signal identified in operation 950 is reflected from the antenna 511.

In an embodiment, the processor 550 may adjust the frequency feature of the antenna 511 according to the position in which the reflected waves are generated, identified in operation 957.

When determining that the position in which the signal is reflected is the particular circuit device (e.g., the switching module 535), the processor 550 may reset at least one circuit device (e.g., the switching module 535) associated with the identified position in operation 961. For example, when the position in which the signal is reflected is the switching module 535, the processor 550 may control the switching module 535 or an interface (e.g., a mobile industry processor interface (MIPI)) of the transmission amplifier 521 in a previous stage of the switching module 535 to reset the switching module 535 or the transmission amplifier 521.

When determining that the position in which the signal is reflected is the antenna 511, the processor 550 may tune a reflection feature value (e.g., a VSWR, a reflection coefficient, a reflection loss) of the antenna 511 through a turner circuit (not shown, including e.g., an inductor, a variable capacitor, and a tuning switch) of the antenna 511 in operation 965. For example, the VSWR may mean a height ratio of standing waves generated by reflection in the antenna 511 and the VSWR may fall beyond a normal range in a specific frequency band. In this case, when a matching operation with respect to a variable frequency is performed using the tuner circuit, the VSWR in a frequency band beyond the normal range may be adjusted to a normal value as the standing waves vary.

Figure 10:
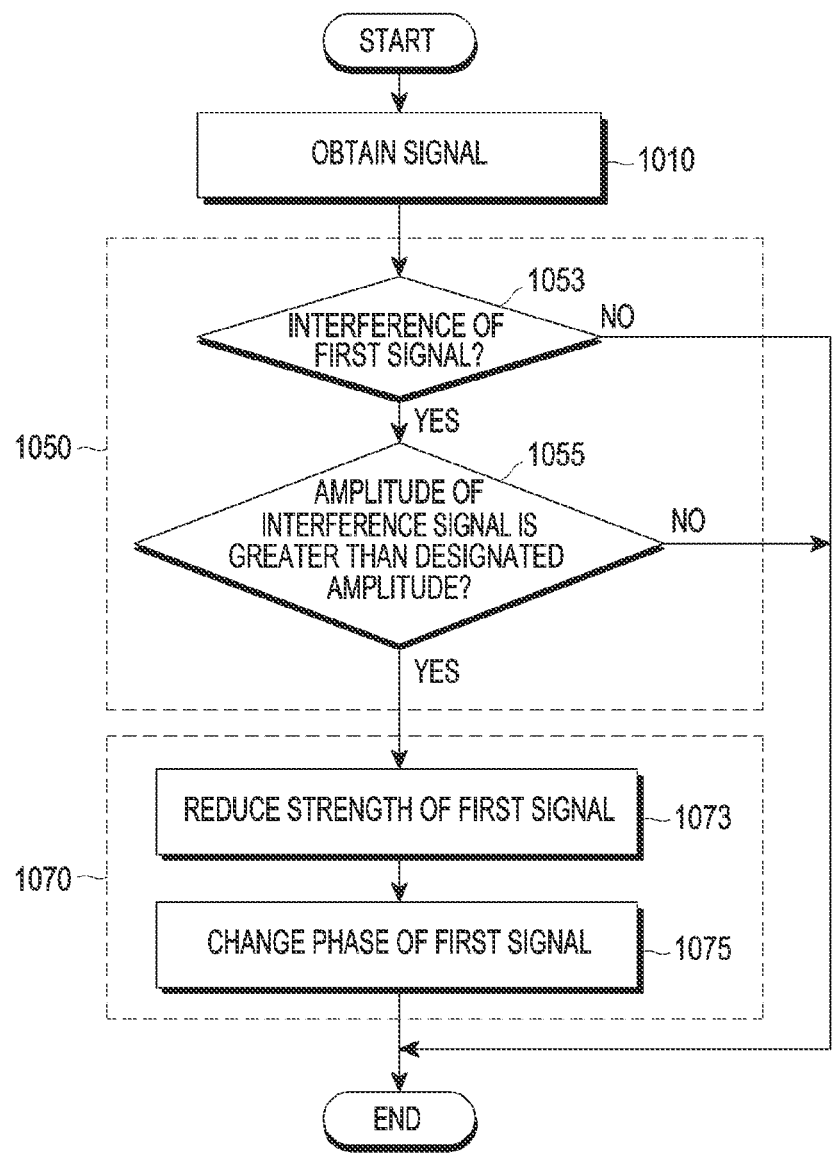

FIG. 10 is a flowchart showing a method for improving antenna performance of another electronic device according to various embodiments. The method shown in FIG. 10 may be executed by the electronic device 501 of FIG. 5B or FIG. 6. The method of FIG. 10 may be intended to prevent the problematic situation caused by multiple antennas or a multi-frequency band, illustrated in FIG. 2B.

For convenience, the method will be described assuming that the method is performed by the electronic device 501 of FIG. 5B and at least a part of the first signal (e.g., B3 Tx(f1)) emitted via the first antenna 511 flows to the second antenna 551 to generate an interference component.

The electronic device 501 may operate in the dual connectivity state where the first frequency band (e.g., the B3 Tx band) and the second frequency band (e.g., the N77 Tx band) are used.

For example, the processor 550 may control the communication module 540 to emit the first signal (e.g., B3 Tx(f1)) of the first frequency band to the first antenna 511 through the first transmission amplifier 521. At the same time, the processor 550 may control the communication module 540 to emit the second signal (e.g., N77 Tx(f2)) of the second frequency band to the second antenna 551 through the second transmission amplifier 561.

In this case, at least a part of the first signal (e.g., B3 Tx(f1)) sent to the first antenna 511 from the first transmission amplifier 521 may flow to the second antenna 551, generating an interference signal. The signal may be input to a power detection port PDET_2 of the communication module 540 through the second circulator 571.

In operation 1010, the communication module 540 of the electronic device 501 may obtain a signal received via the second antenna 551. The processor 550 may obtain the signal through the communication module 540. The signal detected in the second antenna 551 may be at least a part of the first signal (e.g., B3 Tx(f1)) of the first frequency band. The signal may be sent through the second circulator 571 disposed between the second transmission amplifier 561 and the second antenna 551. The signal may be periodically input to the communication module 540 through the second circulator 571.

In operation 1050, the processor 550 may analyze the obtained signal. The processor 550 may analyze a state (e.g., at least one of a frequency, an amplitude, or a phase) of an interference signal input through the second circulator 571 connected to the second transmission amplifier 561.

In an embodiment, operation 1050 may include operations 1053 and 1055.

In operation 1053, the processor 550 may determine whether the signal is the first signal (e.g., B3 Tx(f1)) of the first frequency band. Operation 1053 may be an operation performed by the processor 550 to determine whether an interference component is generated due to signal inflow between multiple antennas 511 and 551.

When determining in operation 1053 that the signal is the interference signal corresponding to at least a part of the signal (e.g., B3 Tx(f1)) of the first frequency band, the processor 550 may proceed to operation 1055.

In operation 1055, the processor 550 may determine whether the amplitude of the signal is an amplitude that affects the reception performance of the signal. For example, when the amplitude of the interference signal is greater than a designated amplitude, the processor 550 may determine that the interference signal affects the reception performance and proceed to operation 1070.

In operation 1070, the processor 550 may adjust a feature of the second signal (e.g., N77 Tx(f2)) emitted via the second antenna 551 by using the second transmission amplifier 561 or the communication module 540, based at least in part on that the signal identified in operation 1050 includes at least a part of the first signal (e.g., B3 Tx(f1)).

When determining in operation 1050 that inflow of the first signal (e.g., B3 Tx(f1)) occurs or a corresponding interference component is generated, the processor 550 may perform operation 1070 to perform isolation between the multiple antennas 511. Operation 1050 may control at least one isolation feature of the multiple antennas 511. Operation 1070 may include at least one of operation 1073 or operation 1075. According to an embodiment, operation 1073 or operation 1075 may be selectively performed or both of them may be performed.

In operation 1073, the processor 550 may reduce the strength of the first signal (e.g., B3 Tx(f1)) of the first frequency band to prevent inflow of the first signal (e.g., B3 Tx(f1)) or generation of a corresponding interference component. For example, the processor 550 may reduce the strength of the first signal (e.g., B3 Tx(f1) through maximum power reduction (M-PR).

In operation 1075, the processor 550 may change the phase of the first signal (e.g., B3 Tx(f1)) of the first frequency band to improve an isolation effect. For example, the processor 550 may change the phase of the first signal (e.g., B3 Tx(f1)) to a phase shifted in a direction to increase isolation from the current phase.

Figure 11:
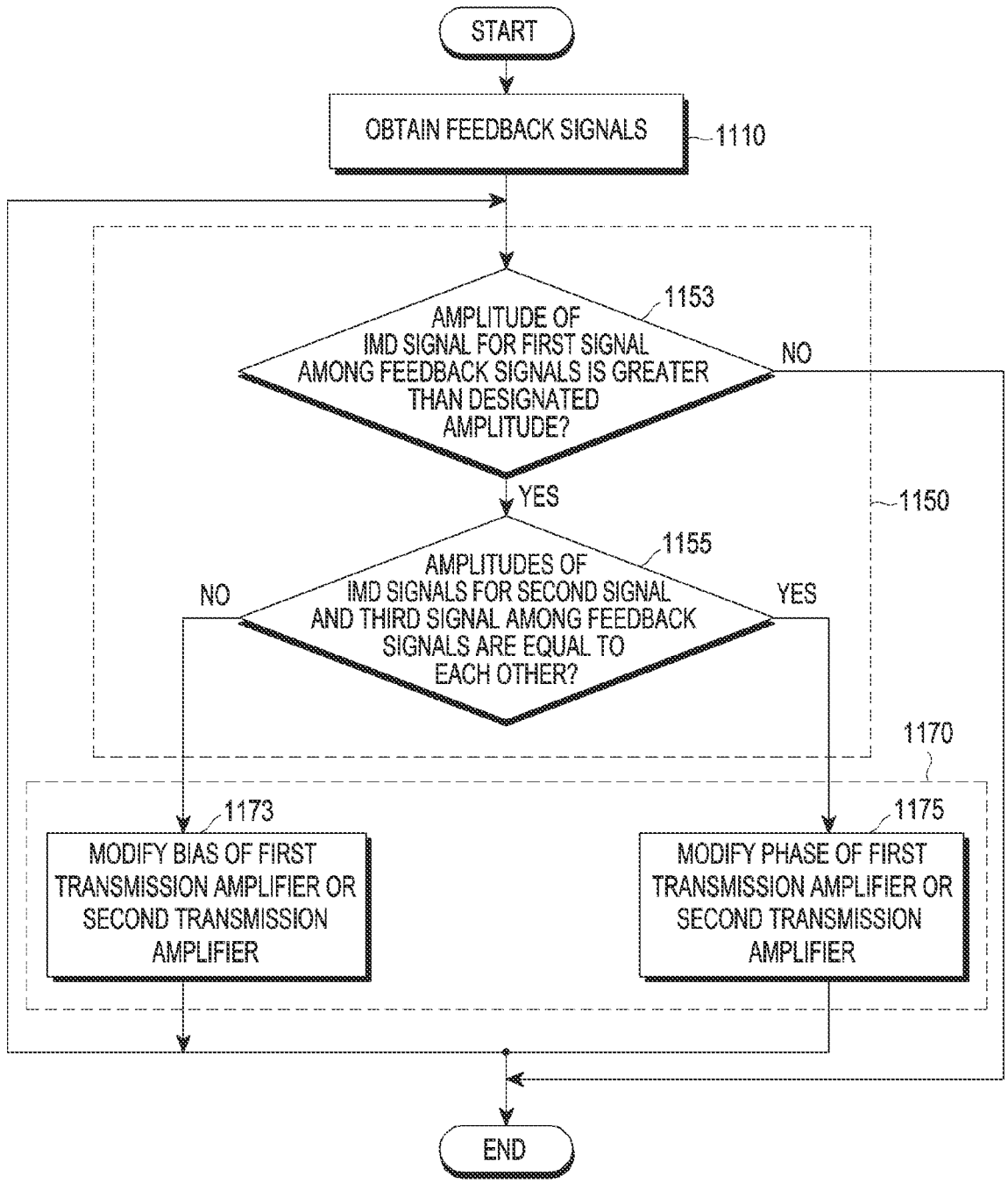

FIG. 11 is a flowchart showing a method for improving antenna performance of another electronic device according to various embodiments. The method shown in FIG. 11 may be executed by the electronic device 501 of FIG. 6. The method of FIG. 11 may be intended to prevent the problematic situation caused by multiple antennas or a multi-frequency band, illustrated in FIG. 2C.

As shown in FIG. 6, the communication module 540 may be connected with the first coupler 635_1 connected to the output of the first transmission amplifier 621, the second coupler 635_2 connected to the output of the second transmission amplifier 625, and the third coupler 635_3 in the previous stage of the antenna 511.

In operation 1110, the communication module 540 of the electronic device 501 may receive signals fed back through the first coupler 635_1, the second coupler 635_2, or the third coupler 635_3. The feedback signals may include a first signal obtained from the first coupler 635_1, a second signal obtained from the second coupler 635_2, or a third signal obtained from the third coupler 635_3.

The processor 550 may obtain at least one feedback signals of the first signal, the second signal, or the third signal through the communication module 540.

The feedback signal may include a signal of an IMD component. The feedback signal may include a signal of an IMD component between transmission signals. The feedback signal may include a signal in the previous stage of the antenna 511. The feedback signal may include a signal (e.g., IMD(f2−f1)) of an IMD component resulting from the first signal (e.g., B3 Tx(f1)). For example, the feedback signal may include the IMD signal (e.g., IMD(f2−f1)) between the first signal (e.g., B3 Tx(f1)) emitted via the first antenna 511 and the second signal (e.g., N77 Tx(f2)) emitted via the second antenna 551, In operation 1150, the processor 550 may identify or analyze the fundamental signal and the IMD signal from the feedback signal. For example, the processor 550 may be fed back with the first signal, the second signal, and the third signal from the first coupler 6351, the second coupler 635_2, and the third coupler 635_3 through the communication module 540, separate each of the fed signals into the fundamental signal and the IMD signal, and analyze the state (e.g., at least one of the frequency, the amplitude, or the phase) of the IMD signal.

In an embodiment, operation 1150 may include operations 1153 and 1155.

In operation 1153, the processor 550 may determine whether an amplitude of the IMD signal for the first signal obtained from the first coupler 635_1 is greater than a designated amplitude (e.g., a default value).

When determining in operation 1153 that the amplitude of the IMD signal for the first signal is greater than the designated amplitude, the processor 550 may determine whether the amplitudes of the IMD signals for the second signal and the third signal obtained from the second coupler 635_2 and the third coupler 653_3 are substantially equal to each other (e.g., are within the same range).

When determining in operation 1150 that the amplitude of the IMD signal for the first signal is greater than the designated amplitude, the processor 550 may proceed to operation 1170 to adjust the first transmission amplifier 621 and the second transmission amplifier 625.

When the amplitude of the IMD signal for the first signal is less than the designated amplitude, a subsequent operation for cancellation or attenuation of the IMD component may not be performed.

When determining in operation 1150 that the amplitude of the IMD signal for the first signal is greater than the designated amplitude, but the amplitudes of the IMD signals for the second signal and the third signal are substantially different from each other, the processor 550 may proceed to operation 1173.

In operation 1173, the processor 550 may lower the transmission power level by modifying the bias of the first transmission amplifier 521 or the second transmission amplifier 561, thereby reducing the amplitude of the IMD signal.

When determining in operation 1150 that the amplitude of the IMD signal for the first signal is greater than the designated amplitude and the amplitudes of the IMD signals for the second signal and the third signal are substantially equal to each other, the processor 550 may proceed to operation 1175.

In operation 1175, the processor 550 may compensate for a phase deviation between the two transmission amplifiers 621 and 625 by modifying the phase of the first transmission amplifier 621 or the second transmission amplifier 625, thereby cancelling the ID signal.

FIGS. 12A and 12B are views for describing an effect of an electronic device according to various embodiments.

FIGS. 12A and 12B show isolation feature simulation results of two antennas in which an IMD signal per isolation is shown. FIG. 12A shows an isolation feature simulation result in a comparison example (e.g., FIG. 2B) where a single transmission amplifier is used for each antenna, and FIG. 12B shows an isolation feature simulation result in an embodiment (e.g., FIG. 6).

Simulation Conditions are as Below:
Transmission Power Level of First Transmission Signal Tx1 in First Antenna (e.g., First Antenna 511): 30 dBm for First Case, 27 dBm for Second Case
Transmission Power Level of Second Transmission Signal Tx2 in Second Antenna (e.g., Second Antenna 551): 30 dBm
Transmission Power Level of Second Transmission Signal Tx2 Measured in Output Terminal of Transmission Amplifier in First Antenna (e.g., First Antenna 511): 20 dBm for Isolation Degree of 10 dB, 10 dBm for 20 dB, and 0 dBm for 30 dB Referring to FIG. 12A, when the power level of the transmission signal Tx1 is 30 dBm, an IMD performance feature may be satisfied for an isolation degree of 40 dB or higher (see 1211 and 1215). When the power level of the transmission signal Tx1 is 27 dBm, an isolation degree of 30 dB may be required (see 1213 and 1217).

Referring to FIG. 12B, it can be seen that in the same condition, an IMD improvement effect equivalent to an isolation degree of 20 dB may be achieved (see 1251 and 1255).

Thus, combustion of a circuit device or degradation of antenna performance (e.g., sensitivity, transmission performance, or reception performance) may be prevented. In spite of a structural limitation including a low antenna isolation degree, the IMD component may be minimized to improve the degree of freedom in antenna designing.

According to various embodiments, an electronic device (e.g., the electronic device 501) may include a transmission amplifier (e.g., the transmission amplifier 521), an antenna (e.g., the antenna 511), a circulator (e.g., the circulator 531) disposed between the transmission amplifier and the antenna, a communication module (e.g., the communication module 540) connected to the circulator to identify a signal received via the antenna, and a processor (e.g., the processor 550). The processor may be configured to identify the signal through the communication module and adjust a frequency feature of the antenna based at least in part on that the signal is a signal reflected from the antenna.

According to various embodiments, the processor may be configured to determine whether the signal is a signal reflected from the antenna, based on at least one of a frequency, an amplitude, or a phase of the signal.

According to various embodiments, the processor may be configured to identify a position in which the signal is reflected, based on the phase of the signal and adjust a frequency feature of the antenna based on that the position in which is reflected.

According to various embodiments, the processor may be configured to determine based on the frequency of the signal whether the signal is associated with a transmission signal output through the transmission amplifier and identify the position in which the signal is reflected, based on that the signal is associated with the transmission signal.

According to various embodiments, the processor may be configured to reset the switching module or the transmission amplifier to adjust a frequency feature of the antenna, based on that the position in which the signal is reflected is a switching module connected to the antenna.

According to various embodiments, the processor may be configured to tune a reflection feature value of the antenna to adjust a frequency feature of the antenna, based on that the position in which the signal is reflected is an antenna.

According to various embodiments, an electronic device (e.g., the electronic device 501) may include a first transmission amplifier (e.g., the first transmission amplifier 521) configured to amplify a first signal of a first frequency band, a second transmission amplifier (e.g., the second transmission amplifier 561) configured to amplify a second signal of a second frequency band, a first antenna (e.g., the first antenna 511) connected to the first transmission amplifier, a second antenna (e.g., the second antenna 551) connected to the second transmission amplifier, a circulator (e.g., the circulator 531) disposed between the first transmission amplifier and the first antenna, a communication module (e.g., the communication module 540) connected to the circulator to identify a signal received via the first antenna, and a processor (e.g., the processor 550). The processor is configured to send a signal of the first frequency band to the first transmission amplifier, send a signal of the second frequency band to the second transmission amplifier, identify the signal received via the first antenna, through the communication module, and adjust a feature of the second signal emitted via the second antenna by using the second transmission amplifier or the communication module, based at least in part on that the signal received via the first antenna includes at least a part of the second signal.

According to various embodiments, the processor may be configured to determine based on a frequency of the signal whether the signal includes at least a part of the second signal and determine whether an amplitude of the second signal is greater than a designated amplitude, based on that the signal includes at least a part of the second signal.

According to various embodiments, the processor may be configured to reduce a strength of the second signal emitted via the second antenna by using the second transmission amplifier or the communication module, based on that the amplitude of the signal is greater than the designated amplitude.

According to various embodiments, the processor may be configured to change a phase of the second signal emitted via the second antenna by using the second transmission amplifier or the communication module, based on that the amplitude of the signal is greater than the designated amplitude.

According to various embodiments, the electronic device may further include a second circulator disposed between the second transmission amplifier and the second antenna.

According to various embodiments, an electronic device (e.g., the electronic device 501) may include a first transmission amplifier (e.g., the first transmission amplifier 621) and a second transmission amplifier (e.g., the second transmission amplifier 625) configured to amplify a designated signal, a first coupler (e.g., the first coupler 635_1) configured to obtain at least a part of a first signal amplified through the first transmission amplifier, a second coupler (e.g., the second coupler 635_2) configured to obtain at least a part of a second signal amplified through the second transmission amplifier, a third coupler (e.g., the third coupler 635_3) configured to obtain at least a part of a third signal generated based at least in part on the first signal and the second signal, a communication module (e.g., the communication module 540) connected to the first coupler, the second coupler, and the third coupler, and a processor (e.g., the processor 550). The processor may be configured to obtain at least a part of the first signal, at least a part of the second signal, and at least a part of the third signal through the communication module and adjust the first transmission amplifier or the second transmission amplifier, based at least in part on a determination that an amplitude of an intermodulation distortion (IMD) signal for the at least a part of the first signal is greater than a designated amplitude and amplitudes of IMD signals for the at least a part of the second signal and the at least a part of the third signal are substantially equal to each other.

According to various embodiments, the processor may be configured to modify a bias of the first transmission amplifier or the second transmission amplifier when adjusting the first transmission amplifier or the second transmission amplifier.

According to various embodiments, the processor may be configured to modify a phase of the first transmission amplifier or the second transmission amplifier when adjusting the first transmission amplifier or the second transmission amplifier.

According to various embodiments, the electronic device may further include a first antenna emitting the signal of the first frequency band a circulator (e.g., the circulator 631) disposed between the first transmission amplifier or the second transmission amplifier and the first antenna.

According to various embodiments, the electronic device may further include a second antenna (e.g., the second antenna 551) isolated from the first antenna and emitting a fourth signal of the second frequency band.

According to various embodiments, the communication module may be connected to the circulator to identify a signal received via the first antenna. The processor may be configured to identify the signal through the communication module and adjust the first transmission amplifier or the second transmission amplifier based at least in part on that the signal includes at least a part of an IMD signal for the fourth signal.

According to various embodiments, the electronic device may further include a first hybrid coupler (e.g., the first hybrid coupler 633_1) connected to inputs of the first transmission amplifier and the second transmission amplifier and a second hybrid coupler (e.g., the second hybrid coupler 633_2) connected to outputs of the first transmission amplifier and the second transmission amplifier.

According to various embodiments, the first hybrid coupler may include an input impedance matching circuit (e.g., the input matching circuit 811) and the second hybrid coupler may include an output impedance matching circuit (e.g., the output matching circuit 815). The electronic device may further include a first parallel capacitor (e.g., the first parallel capacitor 851) connected to the first coupler and a second parallel capacitor (e.g., the second parallel capacitor 853) connected to the second coupler.

According to various embodiments, the first transmission amplifier and the second transmission amplifier may include driving-stage amplifiers (e.g., the driving-stage amplifiers 621_1 and 625_1) and power-stage amplifiers (e.g., the power-stage amplifiers 621_3 and 625_3), respectively. The processor may modify a bias of a power-stage amplifier of each of the first transmission amplifier and the second transmission amplifier, based on an IMD signal for at least a part of the first signal, when adjusting the first transmission amplifier or the second transmission amplifier.

The invention claimed is:

1. An electronic device comprising:
a transmission amplifier;
an antenna;
a circulator disposed between the transmission amplifier and the antenna;
a communication module connected to the circulator to identify a signal received via the antenna;
a switching module connected to the antenna; and
a processor,
wherein the processor is configured to:
identify the signal,
identify a position in which the signal is reflected, based on a phase of the signal,
adjust a frequency feature of the antenna based on the position in which the signal is reflected, and
reset the transmission amplifier or the switching module to adjust the frequency feature of the antenna based on the position in which the signal is reflected from the switching module.

2. The electronic device of claim 1, wherein the processor is further configured to determine whether the signal is a signal reflected from the antenna, based on at least one of a frequency, an amplitude, or the phase of the signal.

3. The electronic device of claim 1, wherein the processor is further configured to:
determine based on a frequency of the signal whether the signal is associated with a transmission signal output through the transmission amplifier; and
identify the position in which the signal is reflected, based on the signal being associated with the transmission signal.

4. The electronic device of claim 1, wherein the processor is further configured to tune a reflection feature value of the antenna to adjust the frequency feature of the antenna, based on that the position in which the signal is reflected.

5. An electronic device comprising:
a first transmission amplifier configured to amplify a first signal of a first frequency band;
a second transmission amplifier configured to amplify a second signal of a second frequency band;
a first antenna connected to the first transmission amplifier;
a second antenna connected to the second transmission amplifier;
a circulator disposed between the first transmission amplifier and the first antenna;
a communication module connected to the circulator to identify a signal received via the first antenna; and
a processor,
wherein the processor is configured to:
send a first signal of the first frequency band to the first transmission amplifier;
send a second signal of the second frequency band to the second transmission amplifier;
identify the first signal received via the first antenna including at least a part of the second signal by using the communication module; and
adjust a feature of the second signal emitted via the second antenna by using the second transmission amplifier or the communication module, based on the identification of the first signal including the at least a part of the second signal.

6. The electronic device of claim 5, wherein the processor is configured to:
determine based on a frequency of the signal whether the signal comprises at least a part of the second signal; and
determine whether an amplitude of the second signal is greater than a designated amplitude, based on that the signal comprises at least a part of the second signal.

7. The electronic device of claim 5, wherein the processor is configured to reduce a strength of the second signal emitted via the second antenna by using the second transmission amplifier or the communication module, based on that the amplitude of the signal is greater than the designated amplitude.

8. The electronic device of claim 5, wherein the processor is configured to change a phase of the second signal emitted via the second antenna by using the second transmission amplifier or the communication module, based on that the amplitude of the signal is greater than the designated amplitude.

9. The electronic device of claim 5, further comprising a second circulator disposed between the second transmission amplifier and the second antenna.

10. An electronic device comprising:
a first transmission amplifier and a second transmission amplifier configured to amplify a designated signal;
a first coupler configured to obtain at least a part of a first signal amplified through the first transmission amplifier;
a second coupler configured to obtain at least a part of a second signal amplified through the second transmission amplifier;
a third coupler configured to obtain at least a part of a third signal generated based at least in part on the first signal and the second signal;
a communication module connected to the first coupler, the second coupler, and the third coupler; and
a processor,
wherein the processor is configured to:
obtain at least a part of the first signal, at least a part of the second signal, and at least a part of the third signal through the communication module; and
adjust the first transmission amplifier or the second transmission amplifier, based at least in part on a determination that an amplitude of an inter-modulation distortion (IMD) signal for the at least a part of the first signal is greater than a designated amplitude and amplitudes of IMD signals for the at least a part of the second signal and the at least a part of the third signal are substantially equal to each other.

11. The electronic device of claim 10, wherein the processor is configured to modify a bias of the first transmission amplifier or the second transmission amplifier when adjusting the first transmission amplifier or the second transmission amplifier.

12. The electronic device of claim 10, wherein the processor is configured to modify a phase of the first transmission amplifier or the second transmission amplifier when adjusting the first transmission amplifier or the second transmission amplifier.

13. The electronic device of claim 10, further comprising:
a first antenna emitting the signal of the first frequency band; and
a circulator disposed between the first transmission amplifier or the second transmission amplifier and the first antenna.

* * * * *